United States Patent
Johnson et al.

[19]

[11] Patent Number: 5,889,534
[45] Date of Patent: Mar. 30, 1999

[54] CALIBRATION AND REGISTRATION METHOD FOR MANUFACTURING A DRUM-BASED PRINTING SYSTEM

[75] Inventors: Neill Arthur Kelso Johnson, Bloomington; Lawrence J. Lukis, Long Lake; John Patrick Novotny, Burnsville; Robert Anthony Laumeyer, Minneapolis, all of Minn.

[73] Assignee: Colorspan Corporation, Eden Prairie, Minn.

[21] Appl. No.: 711,992

[22] Filed: Sep. 10, 1996

[51] Int. Cl.⁶ .................................................. B41J 29/393
[52] U.S. Cl. ................. 347/19; 347/14; 400/74; 400/279
[58] Field of Search ................ 400/74, 120.18, 400/279; 347/5, 14, 19

[56] References Cited

U.S. PATENT DOCUMENTS

| | | | |
|---|---|---|---|
| 4,621,801 | 11/1986 | Sanchez | 400/633 |
| 5,606,648 | 2/1997 | Wlther | 347/131 |
| 5,648,808 | 7/1997 | Yanagi | 347/104 |

Primary Examiner—John S. Hilten
Attorney, Agent, or Firm—Paul H. McDowall

[57] ABSTRACT

The present invention relates to the a method usable in the field of printing, and in particular to a method of characterizing a drum-based digital print engine so that each of a plurality of ink droplets propelled toward a common picture element location, or pixel, of a print media coupled to an exterior surface of a rotating drum member precisely reaches the same pixel location irregardless of slight variations in portions of the surface of the drum. In a preferred embodiment, a drum based printing system contains eight print heads mounted on an axially driven carriage assembly and arranged in two rows of four such that no two print heads prints upon a common print swath at any given time, and each row of print heads is further oriented rotationally around a portion of the circumference of the drum member. All print heads operate relatively independently of fixed firing locations, and instead operate based on a first firing printing head so that each subsequent print heads fire only after a predetermined delay due simply to its rotational and axial displacement from the first print head. Slight variations in the surface of the drum and non concentric alignment of a rotation sensor coupled to the axis of rotation of the drum are compensated during initial assembly of the print engine. In one embodiment, this technique allows implementation of effective and simple calibration process for a four hundred nozzle wide format ink jet digital print engine during printing by an end user.

5 Claims, 26 Drawing Sheets

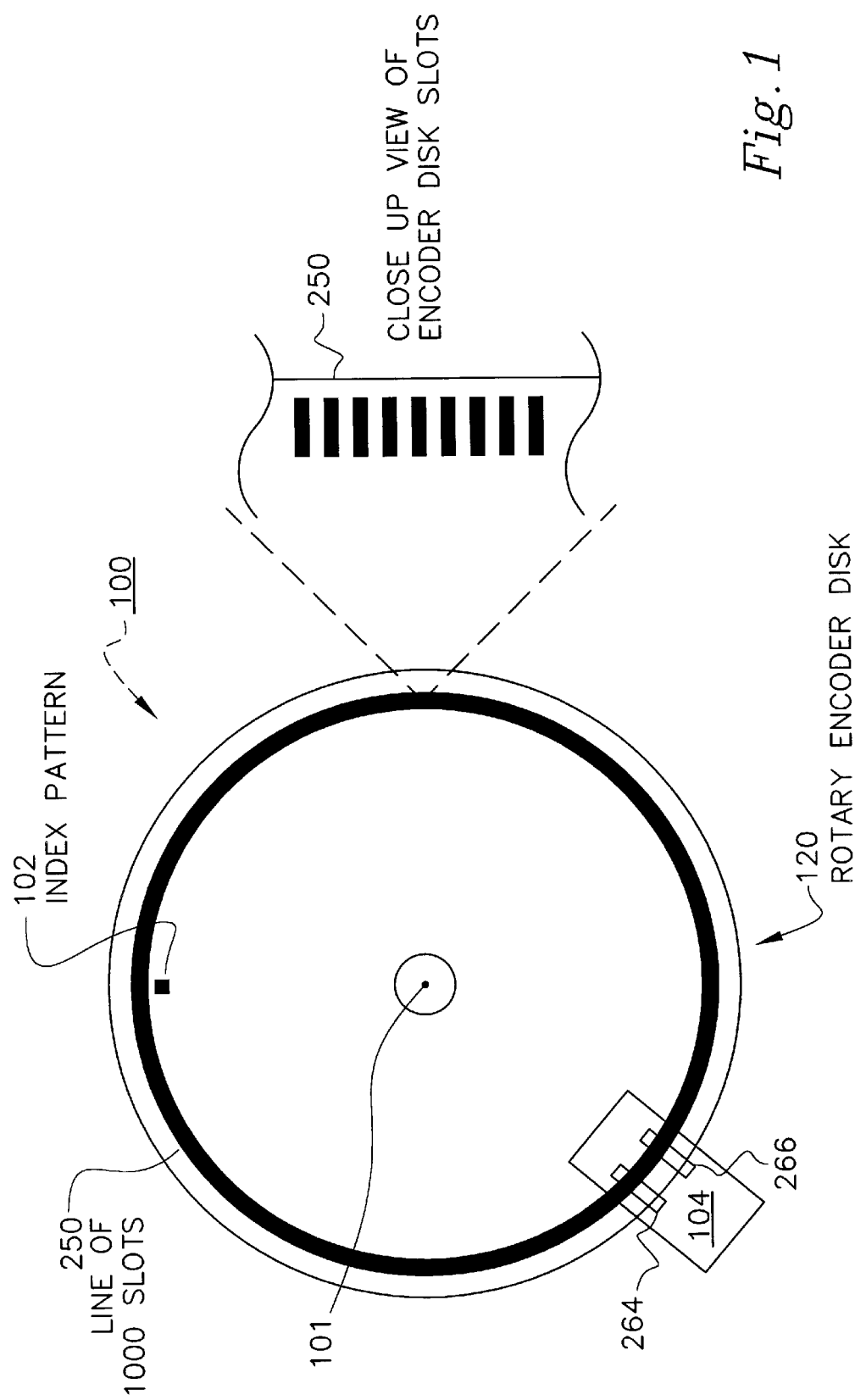

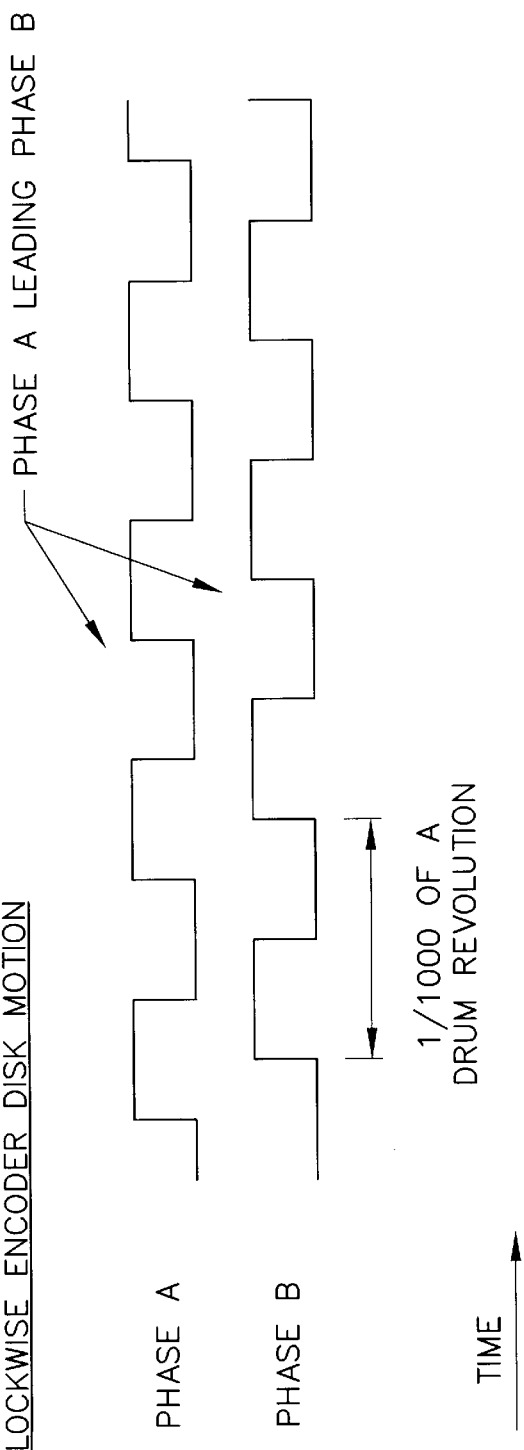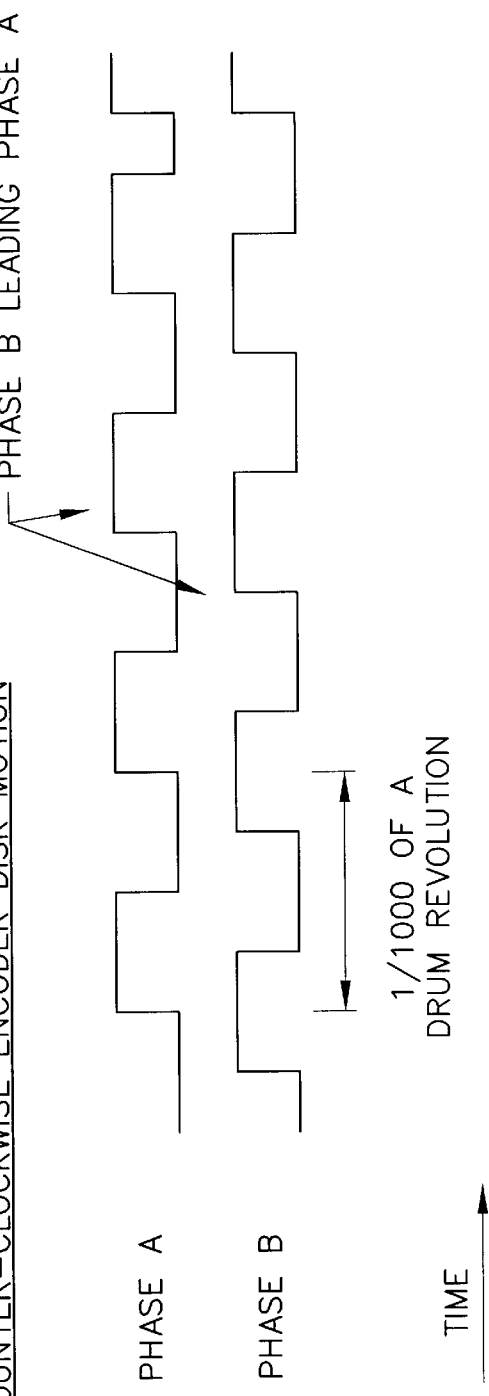

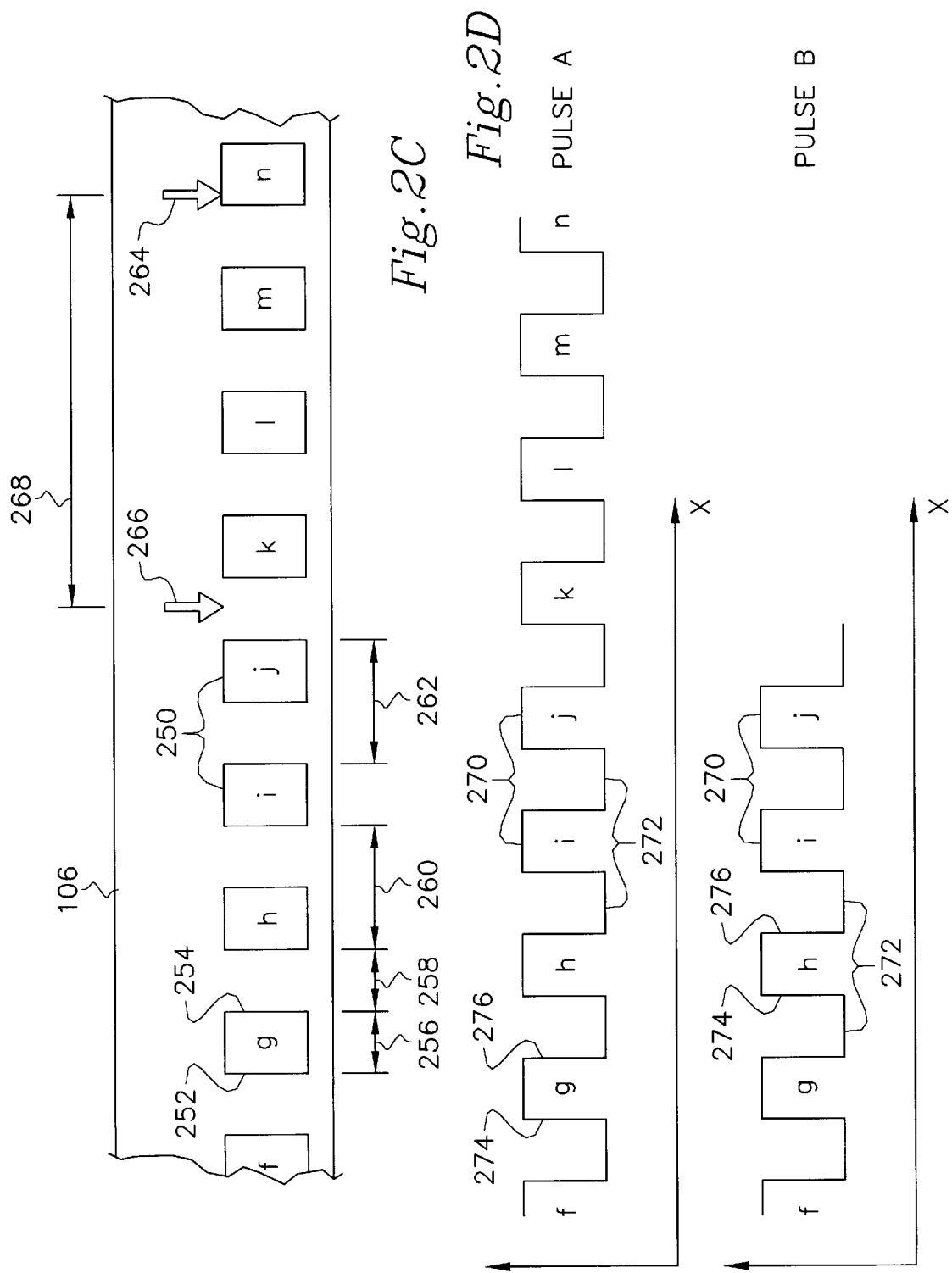

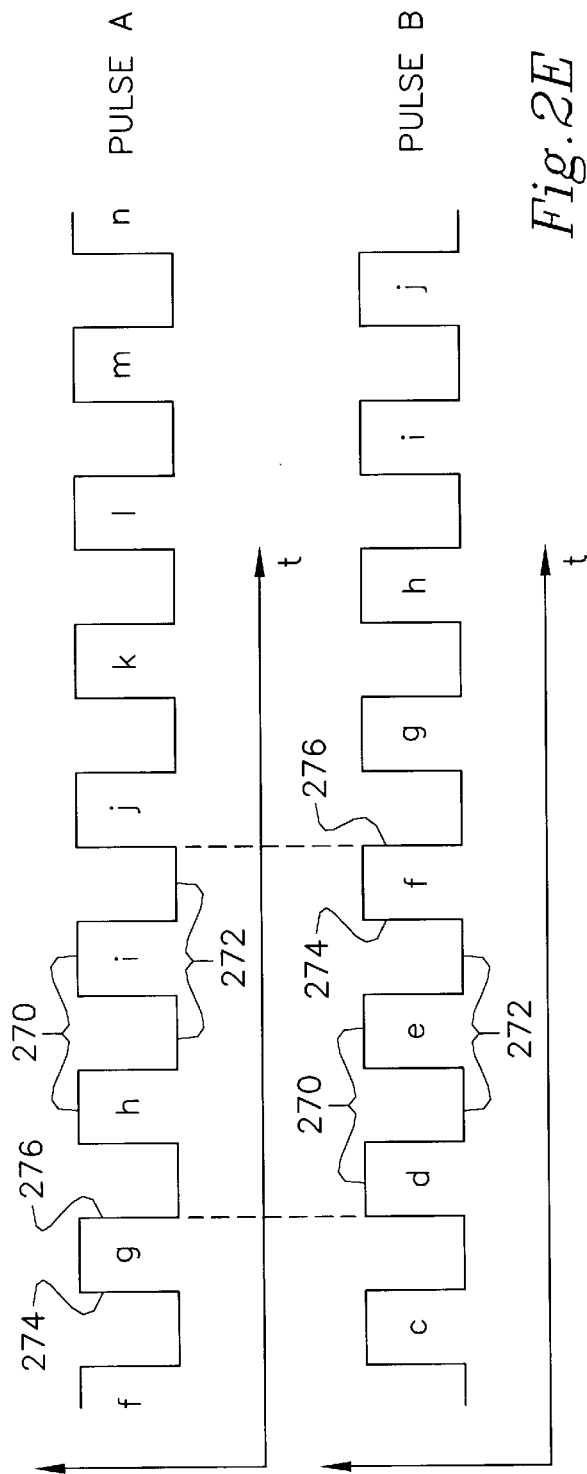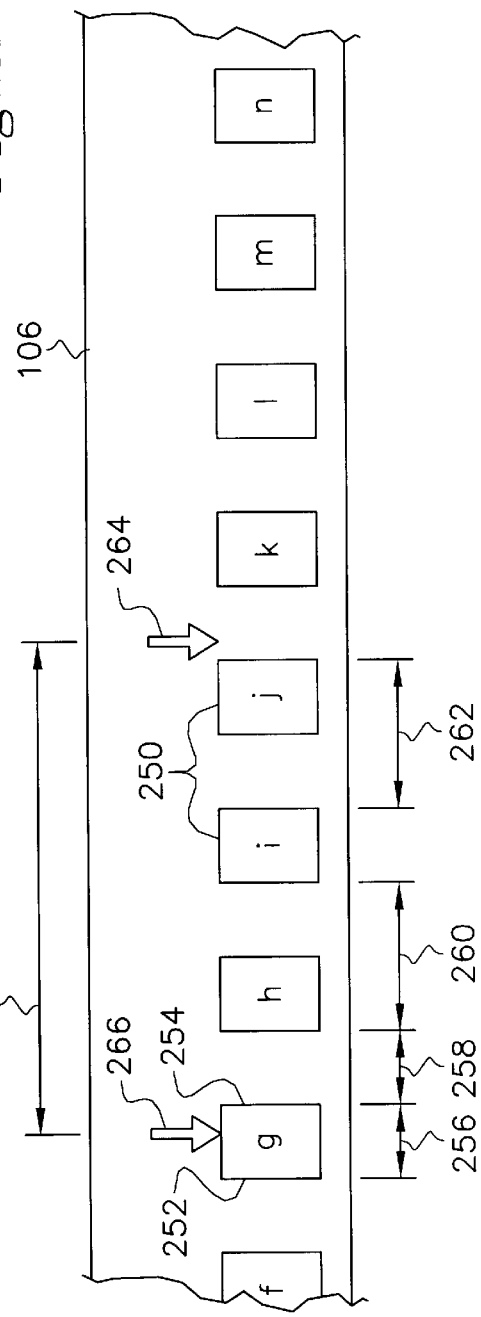
Fig.2E
Fig.2F

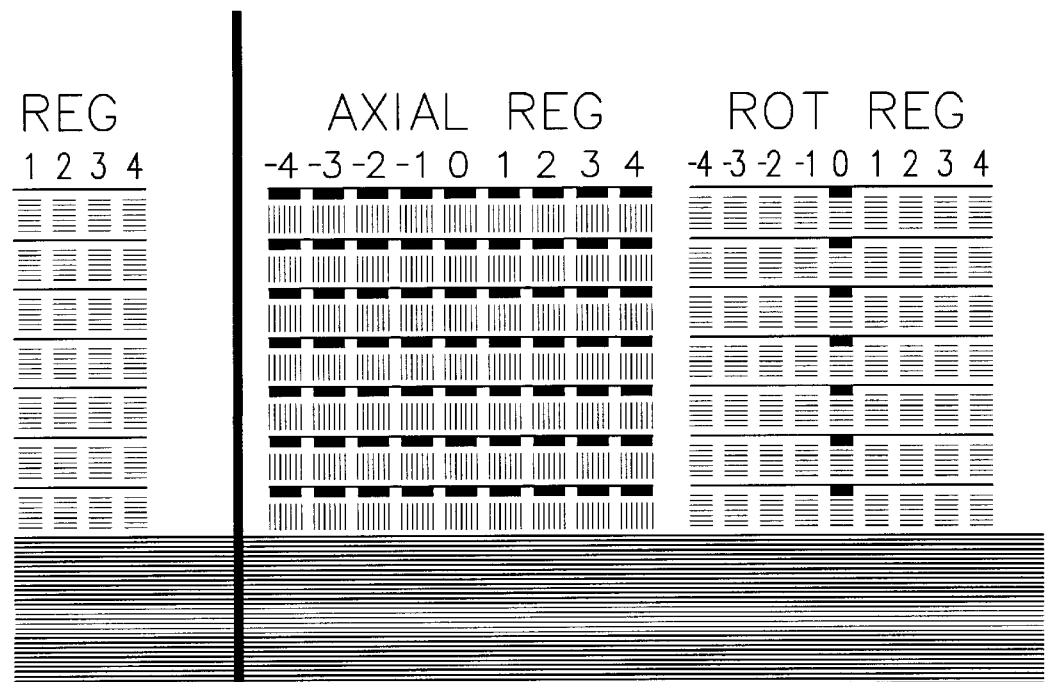
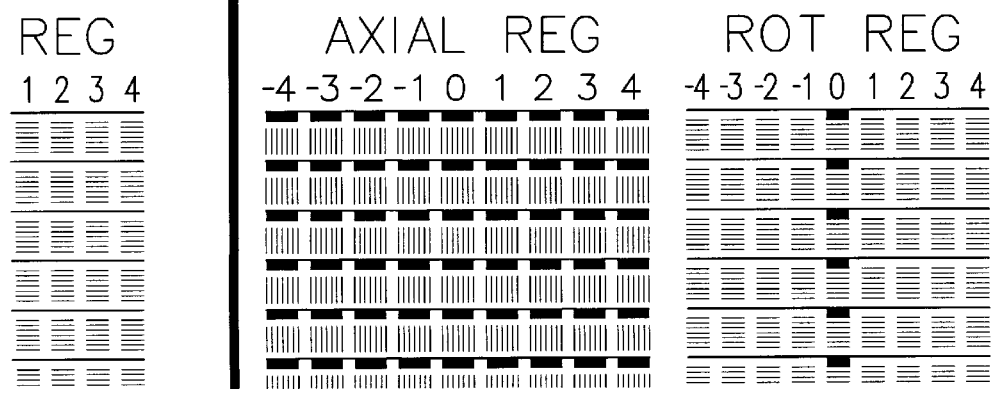
Fig. 14B

CALIBRATION AND REGISTRATION METHOD FOR MANUFACTURING A DRUM-BASED PRINTING SYSTEM

FIELD OF THE INVENTION

The present invention relates to the field of printing, and in particular to a method of characterizing performance of a drum-based digital print engine during manufacturing so that during later printing operations each of a plurality of ink droplets propelled toward a common location on a printing medium coupled to an exterior surface of a rotating drum precisely reaches the common location regardless of slight variations in portions of the surface of the drum or non-concentric alignment of an axis of the drum and a rotation sensor. In a preferred embodiment, a drum-based printing system contains multiple print heads mounted on an axially driven carriage assembly and arranged in two spaced apart rows such that no two print heads print upon a common print swath at any given instant of time, and each row of print heads is further oriented rotationally around a portion of the circumference of the drum member and are calibrated with respect to each other ink emitting nozzle of each of the print heads.

BACKGROUND OF THE INVENTION

Ink jet printers that utilize replaceable print heads, for example ink jet cartridges, often have problems precisely aligning a plurality of ink emitting nozzles, or jets, associated with each discrete ink jet cartridge which cannot easily be corrected through mechanical manipulation of a respective print head or a carriage to which the print head releaseably engages. These alignment problems become aggravated as the number of cartridges, and therefore the number of ink jet nozzles increase, as the spacing between the (furthest) jet nozzles increases, and resultant differing mounting locations among print heads following replacement of print heads. In prior art calibration techniques used to determine what adjustment is necessary typically require a printed test pattern, manual observation, entry of corrective values into print control circuitry, and retesting to confirm proper orientation among the several print heads.

In a wide format ink jet printer employing a subtractive color ink set, such as cyan, magenta, yellow, and black (CMYK) inks, typically a corresponding number of print heads are mechanically and electronically coupled to precisely locate, and therefore combine colored ink droplets to obtain a desired broad visual impression of color and tone, or color gamut, to a human viewer. The mechanical alignment among the print heads is referred to as "register" and "perfect registration" is a objective of the present invention herein, so that when desired colored ink droplets propelled from any of a plurality of ink emitting nozzles of each print head arrives at precisely the same location to thereby create a desired impression of a color to a human viewer. Because differences in primary ink colors are generally easily detectable by the viewer and provide ready demarcation points relative to the print head, it is common to provide a relatively simple calibration routine so that an end user may calibrate each of the print heads and their respective nozzles with respect to each other to obtain a defined acceptable range of dot placement. In addition, typically during manufacture of a wide format print engine a select number of quality assurance and other engineering verification tests help assure each print engine built meets or exceeds its specification so that an end user may later perform such relatively simple end user calibration routines and thus successfully calibrate and compensate for different positional location and alignment among several replaceable print heads. To efficiently and successfully implement such a manufacturing process requires an amount of flexibility in successfully adapting to unique build characteristics of each print engine. Thus a need exists in the art for adapting to build characteristics of cooperating subassemblies so that an end user may successfully utilize the aforesaid relatively simple calibration techniques without difficulty.

For example, the relatively simple calibration routine typically involves visual inspection of printed output from a print head that may have a cyan set of ink jet nozzles which are nominally a number of pixels horizontally offset from the black set of jets. A test pattern may be laid down by the cyan jets followed by test pattern laid down by the black jets. The test patterns may be compared to determine that, in actual operation, the black set of jets horizontally follows the cyan set of jets by a visually ascertainable number of pixels. In such a case, the timing of the firing of the black set of jets may be adjusted by the ascertained number of pixel locations, so that patterns laid down by the cyan and black jets will better horizontally match each other. Vertical calibration can be carried out in a similar way. Because calibration is an important part of properly aligned printing, the ink jet printing industry continually seeks new and better ways to readily determine what calibration adjustments are needed. In prior art bi-directional print engines having the ink jet nozzles of each print head aligned with the horizontal direction of carriage movement, the y-component can be ignored. In a drum based print engine, however, the y-component of motion contributed by the rotation of the drum member and thus that of a sheet of print media residing thereon must be considered. Furthermore, because the print heads in prior art bi-directional print engines travel over a common printing path relative to an elongate platen only a single narrow path upon the typically elongate platen must be compensated for surface vagaries and imperfections. In a drum-based color print engine, however, the entire surface of the drum can contribute error with simple surface imperfections as each of the print heads must traverse every point of an imageable area on the printing medium. Thus, a need exists for a relatively simple and efficient method of compensating for slight misalignment of cooperating subassemblies of drum based print engines and imperfections in the imageable surface of a print bearing surface portion of the drum member of such print engines.

Additional problems with prior ink jet head configurations involve the mounting of the print head for accurate placement and movement across the printed image. The rail structure for the print head must adequately support the print head not only over the entire printed image, but also for any cleaning, maintenance and other auxiliary functions of the print head. It is common for such a rail to experience what can be described as a sagging phenomena due primarily to the force of gravity, which adds positional error to a final desired printing location.

Furthermore, ink jet printers also need a consistent, accurate method to determine when the ink jets should be fired based on the location of each print head with respect to an image to be printed. Accurate positioning of ink dots on the printed image is necessary for accurate reproduction of the desired image. Prior art bi-directional printers have optically sensed markings from an encoder disk disposed along a linear path of carriage travel to determine print head position. The encoder disk markings are typically more or less evenly spaced apart from each adjacent marking other across the path of travel of the print head. Such an encoder disk reader produces an electrical signal as the print head changes location across the encoder disk, and the prior art ink jets are fired based directly on the timing of the encoder disk signal or are fired based on derivative of the timing signal. Further compensation for time of flight (TOF), and droplet velocity, etc. have been attempted to better describe the behavior of each ink droplet between the nozzle and the printing medium. Prior art encoder disks thus provide one way to determine when the ink jets should be fired in bi-directional prior art print engines. However, various errors prevent the encoder marking from corresponding exactly with the position of an ink dot on the image. These errors tend to be exacerbated as the speed of printing and size of output are increased. High-speed, large format printing requires a high degree of accuracy to generate quality graphics, and improved photorealistic output, so that a need exists for more accurate method of determining when to fire the ink emitting nozzles of a print head based on its location with respect to the image. In drum-based imaging systems, typically a rotary encoder coupled to an axis of rotation of a drum member provides a similar electrical signal which relates to an axial segment of the drum member. A phenomena known as "run out" relates to non-concentric alignment of center points of rotation only, and not to rotation induced error in themselves. This error is compounded where the circumference of the drum member is not perfectly aligned with an axis of rotation of a rotary motion encoder. In addition, the much greater circumference of the drum member compared to the rotary encoder, thus creating a mechanical disadvantage which inherently limits the absolute positional resolution of a control signal directed to the surface of the drum member and based on an output signal from the encoder, which defines a native positional accuracy of a print head control circuit using such an encoder.

Furthermore, in a drum-based print engine as taught herein where every subassembly must be field-replaceable to reduce cost and complexity of on-site diagnosis and repair, this rotary encoder might be separately replaceable from the drum member. Thus, positional error related to non-concentric alignment of the rotary encoder sensor and the axis of rotation of the drum member add complexity and positional error in addition to other sources of error which must be eliminated or compensated by suitable print head control circuitry and carriage drive software. Thus a means to increase the accuracy of such a prior art rotary position sensor in a multi-print head drum-based print engine exists in the prior art.

In the relevant drum-based imaging system prior art, a printing medium attaches to an exterior or interior surface of a rotating drum which rotates to pass the printing medium under one or more print heads, actuators, or sensors mounted on an carriage articulated in an axial direction parallel to the axis of rotation of the drum. The carriage then controllably traverses the width of the drum as the print media dispenses ink upon the print media. The combination of the spinning drum and traversing carriage assures that all print heads can access the full surface of the drum with a plurality of adjacent spiral-shaped print swaths. Thus a need exists in the prior art to correct these inherently skewed boundaries of printed output so that printed output will closely align with a sheet of printing medium appropriately applied to a drum member for receiving a printed image.

Also, prior art drums were typically manufactured to tightly controlled specifications and little if any compensation for dimensional variance in the imaging surface of the drum. Thus, inherent in the prior art is the expense involved in exploiting highly precise manufacturing processes that contribute cost and complexity to the fundamental component of drum-based imaging systems—the drum. Therefore, a need exists in the prior art to exploit low cost manufacturing materials and processes and compensate for surface deviations and inaccuracies and misalignment of subassemblies in relatively complex multi-print head wide format print engines. Furthermore, in this segment of the relevant prior art, which includes drum-based document scanner equipment, a known skewing effect inhibits the creation of truly square corners of the scanned image since absent modification prior art drum-based printing system imaging components inherently print continuous spiral swaths over the print media. In the prior art related to document scanners an image sensitive sensor receives the image in a similar manner, and thus encounter a similar difficulty. One prior art approach for this problem suggests use of a cam member coupled to a carriage drive mechanism so that at the end of a print sized to fill the surface of the drum the carriage is stepped sideways one swath thereby capturing the image with a series of adjacent, non-spiraling, swaths. Besides the obvious limitation inherent in such a design wherein only images sized to fill the printing area of the drum, this approach may not be dynamically modified to suit any particular image. Thus, a need exists in the art to solve this known limitation in the field of drum-based imaging devices, so that truly square corners of documents and images related thereto may be printed without further compensation.

Finally, while other known techniques for tracking and controlling the motion of the drum member, print heads, and carriage assembly might also include optical rotary encoders coupled to the axial shaft of a drum member, and in some circumstances on the carriage motor, the present invention addresses and overcomes the above-noted problems and difficulties in the prior art and offers a much higher level of compensation for variations in the drum surface, non-concentric alignment of a rotation sensor coupled to an axis of rotation of the drum, and changing cartridge placement thereby allowing more precise placement of multiple inks of differing color to form photorealistic full color digital images upon a single segment of media attached to the drum with ability to correct for a lower cost manufacturing process for the drum member and ultimately the entire drum based print imaging engine. The present invention further addresses the need to accurately propel ink from a plurality of nozzles resident on a multi-print head carriage assembly so that ink droplets accurately reach preselected locations on the print medium thereby generating photorealistic output from a relatively low cost computer controlled full color, wide format, ink jet digital drum-based print engine.

SUMMARY OF THE INVENTION

Definitions of sources of error compensated by the inventive method taught and enabled herein: "Encoder run-out:" If the encoder wheel is not concentric with the drum axis the encoder output causes a sinusoidal variation in dot placement circumferentially. The heads, being at different phase angles around the drum member, show the error by different amounts of phase shift (the worst case being a 30 degree phase angle). Since in a preferred embodiment, the diameter of the drum member is 8.6 times larger than the encoder diameter, the print engine is very sensitive to this encoder run-out. "Drum run-out:" The drum run-out effect is similar to the encoder run-out, except there is no mechanical magnification and since the gap from head to drum varies the Time Of Flight (TOF) of each droplet expelled from a head toward a portion of the drum having a larger gap that elsewhere on the drum. Although TOF does not have a significant effect at slow speeds, it can not be neglected at rotational printing velocities greater than 144 rpm. Drum run-out is not necessarily a sinusoidal effect like it appears encoder run-out is, however, similar to the Encoder run-out, about half of the 0.005" TIR specified as an appropriate value for drum run-out can be compensated for with the present inventive technique, thereby reducing the positional error of a given droplet to 0.008" or 2.7 pixels. "Paper Bubbles:" This effect manifests itself in the same manner as drum run-out. The assumption that the bubble height is 0.020" is basically an estimate guess at this point, but seems to reflect actual conditions, although the inventors do not have currently have a way to verify the assumption. Bubbles of 0.003" are effectively viewed as local areas of drum run-out, giving errors of approximately 0.008" or 2.7 pixels.

With respect to the experimental work of the present inventors with respect to the encoder/drum error correction, they state the following—to be able to accurately predict and compensate for drum encoder run-out and drum run-out errors within ½ pixel range. Assumptions: 1) Encoder run-out is sinusoidal, 2) Drum run-out is sinusoidal, 3) Measurement of amplitude and phase angle can be made accurately, and 4) the printing medium can be tensioned tightly enough to reduce bubbles to 0.003" diameter or less.

The inventors have found that suitable registration and associated alignment issues can largely be compensated by adjusting control circuitry that handles the timing of firing of each ink jet nozzle, and therefore the location on a printing medium of each ink droplet expelled therefrom. Furthermore, the inventors have found that most registration errors occur when one attempts to precisely drop ink on the same position of a print from ink cartridges that are located at different axial and rotational positions with respect to a rotary drum, and replaceably electrically and mechanically coupled to a carriage assembly, or head, such that firing of a rotationally spaced apart cartridge must be delayed until it is (approximately) directly on top of the dot the first cartridge fired. To position the second cartridge for firing a person could just move the head along the rail and spin the drum. Unfortunately, there are two practical physical problems complicating this simple process. The rail admittedly is often not exactly parallel to the drum and a rotary drum encoder is not often exactly centered on its axis. These physical "flaws" are best viewed as inherent problems of a manufacturing process for drum-based wide format print engines that must be amenable to cost effective correction during fabrication. The inventors have discovered that some such flaws affect only rotational registration (i.e., encoder run-out) in a consistent and predictable manner—in comparison to axial registration (i.e., drum surface run-out).

The present invention teaches and enables a method which corrects the registration errors on a multi-print head drum-based wide format print engine. All delays among print control command signals to energize a given ink emitting nozzle are based on a synthesized position in a synthesized space modeling the entire of the drum member. The timers referenced herein are actually timers what count synthesized drum encoder locations.

The rotational errors are modeled as a function of the heads position along the rail and the drum's angle with raw data "top of page marker" contained in a software module (reginput.c). A separate software module (vreg.c) uses the modeled mathematical functions to generate at least one two-dimensional lookup tables (LUT's) so that at each encoder interrupt another software module (drum_encoder_lisr) accesses these tables to suitable reprogram each of plurality of print head delay timers, each associated with one of a plurality of print cartridges associated with a multi-print head print engine. The rotational registration errors associated with the position of each discrete print head along a carriage support rail are independent from the errors associated with the angle of the rotating drum member of the print engine. Therefore the rotational registration errors are preferably corrected separately—when possible during manufacture of a drum-based print engine of the present invention. To correct errors along the axis of rotation of the drum member a like number of timers are electronically coupled to each of the print heads and programmed to achieve a controlled duration of delay prior to firing after a common reference point has been passed. These print head delay timers can only be set once per drum revolution and are therefore termed the "OncePerRev" timers. A set if shift registers, however, can be used to adjust the head delays during each encoder pulse by an eighth of a pixel. These timers, termed the "OncePerEncoder" registers, are used to correct errors that vary around the circumference of the exterior surface of the drum member.

In the case where one desires to print at a base index location "0" rotationally, registration correction works as follows: At each position along the support and drive rail for the carriage assembly the OncePerRev timers are changed to compensate for registration errors (most likely) due to rail sag. At each encoder pulse a change to the OncePerEncoder shift registers is made to compensate for synthesized positional errors due to the rotary encoder run-out. When a print using registration correction is examined we expect and in fact find that rotational registration errors are nearly constant at every position along the rail and around the drum (i.e., the sinusoidal variation has been eliminated as the errors are always off by the same number of sub-pixels).

When an image is printed anywhere other than at base index location "0" rotationally the registration correction tables must shift temporally. This is because the OncePerRev timers are read by the hardware whenever the image is at a top-of-page position and not when the drum is at its physical top of page position (position "0"). To correct this the OncePerRev timers must delay as if they were printing at the drum's physical top of page plus or minus the time delay that would have been set by the sum of the OncePerEncoder delays between rotational position 0 and the start of the image.

With the new "inertial drum mapping" as taught and enabled herein, the inventors enjoy the advantage of absolute, that is, the rotational registration errors are corrected in an absolute sense around the drum and relative to head0 along the drum.

This module contains functions to generate and implement mathematical functions used to correct rotational registration. (The functions generated are used by a software module known as vreg.c.). In a preferred embodiment, the inventors urge us of mathematical third order polynomial functions with the coefficients solved for using a least square error fit. The inventors have further discovered that use of a least square error fit of an appropriately chosen sine function adequately models the registration error in each head as it varies around the drum member, and that use of a third order polynomial adequately models an error along the surface of the drum.

At first, the inventors determined the registration error around the drum by measuring the displacement of horizontal lines printed every inch by head 0. The readings are taken using a suitable magnifying eyepiece or other similar instrument such as a digital microscope and then fit by a software module. The inventors note that since a sine function seemed to fit most tested data sets from a drum-based print engine manufactured in accordance with the present invention fairly well—but not perfectly—another mathematical function may be more appropriate. The rotational registration errors along the drum are read off of a small printed portion of a sheet of printing medium proximate an image to be printed, this printed portion is known as a gutter pattern.

It is noteworthy that the inventors have conclusively discovered that in both registration correction along the periphery of and around the circumference of the drum member, chi-squared is used to determine the closeness of fit.

The following figures are not drawn to scale and only detail a few embodiments of the present invention, and thus should not be viewed as limiting the spirit or scope of the present invention to any particular illustrated embodiment of the present invention. The features, dimensions, and tolerances taught and illustrated herein should likewise not be considered as limiting the present invention to any particular embodiment.

DESCRIPTION OF THE DRAWINGS

FIG. 1 is an elevational side view of a first end of a circular encoder disk member having an index pattern and a plurality of slits along the periphery, and includes a partially exploded view of a portion of the periphery of the encoder disk member further illustrating the slots in an enlarged view.

FIGS. 2a–2h depict the encoder reader digital phase relationships for a clockwise rotating drum and for a counter-clockwise rotating drum, as well as the magnified encoder markings.

FIG. 14b depicts an enlarged portion of the calibration patterns of FIG. 14a.

FIG. 15b depicts an enlarged portion of the calibration patterns of FIG. 15a.

DESCRIPTION OF THE PREFERRED EMBODIMENT

Figure 2G:
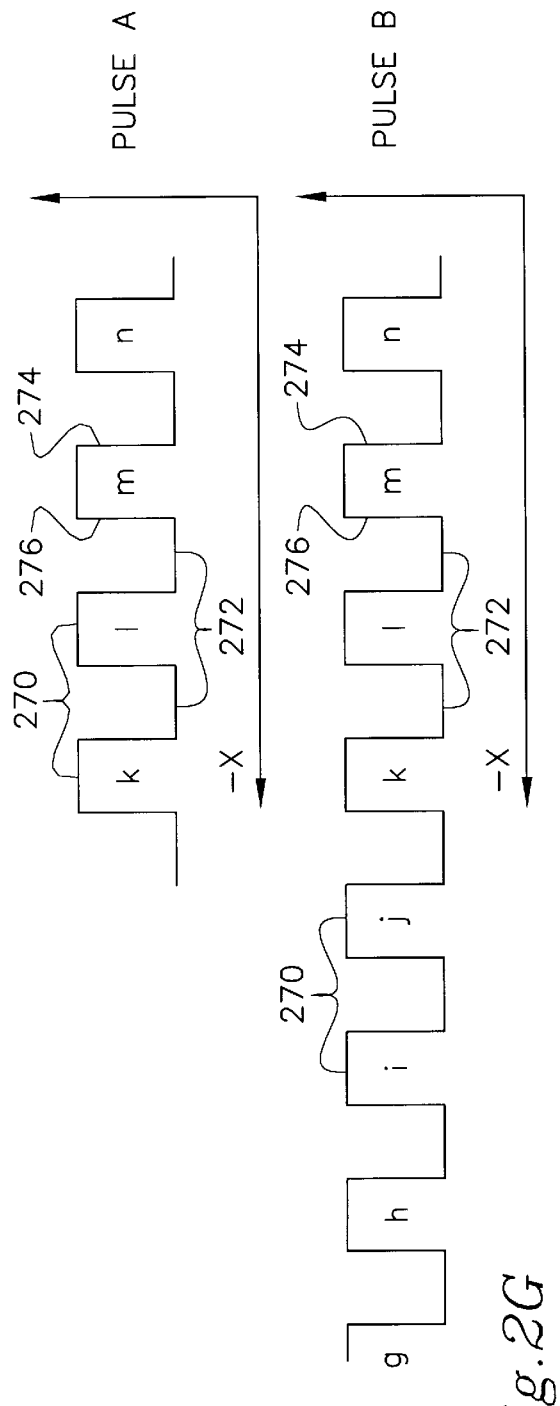

Referring now to FIG. 1, to accurately place ink dots in the rotational dimension, the printing system of the present invention uses an optical rotary encoder system 120 coupled to the axis of rotation 101 of a drum-shaped member 100. This subsystem consists of a encoder disk 106, at least one optical encoder reader 104, and pixel location synthesis logic (see FIG. 3). The encoder disk 106 is a metal disk which contains evenly spaced slots 250 disposed along the circumference of the disk. In a preferred embodiment, one thousand (1000) slots are disposed around the disk 106. The width of each slot is equal to the width of the area between the slots and the disk turns with the drum 100. The disk also contains an index pattern 102, which is a pattern of holes and spaces that is at only one location along the circumference of the disk, and in a different circumference plane than the 1000 slots. This pattern is used to identify one unique location on the disk. The encoder reader used in a drum-based digital printing system of the present invention preferably features two optical emitter/detector pairs that sense the presence or absence of each of a plurality of slots 250 in the optical encoder disk 106 attached to an axis 101 of the drum 100. The encoder disk passes intermediate, or through, the pair of optical encoder readers, which optically senses the presence and absence of the slots and outputs two digital logic signals that indicate the presence/absence of the slots. The two sensors are positioned at a distance so that the electrical signals are shifted ninety degrees from each other. Knowing the drum circumference, and of course the position, and the number of encoder disk slots around the circumference, the velocity of the exterior of surface of the drum can be derived from the interval between encoder disk slots. Additionally, as can be seen with reference to FIG. 2a and 2b, the presence of two optical encoders in the present invention allows detection of the direction of the encoder disk rotary motion.

Figure 2H:
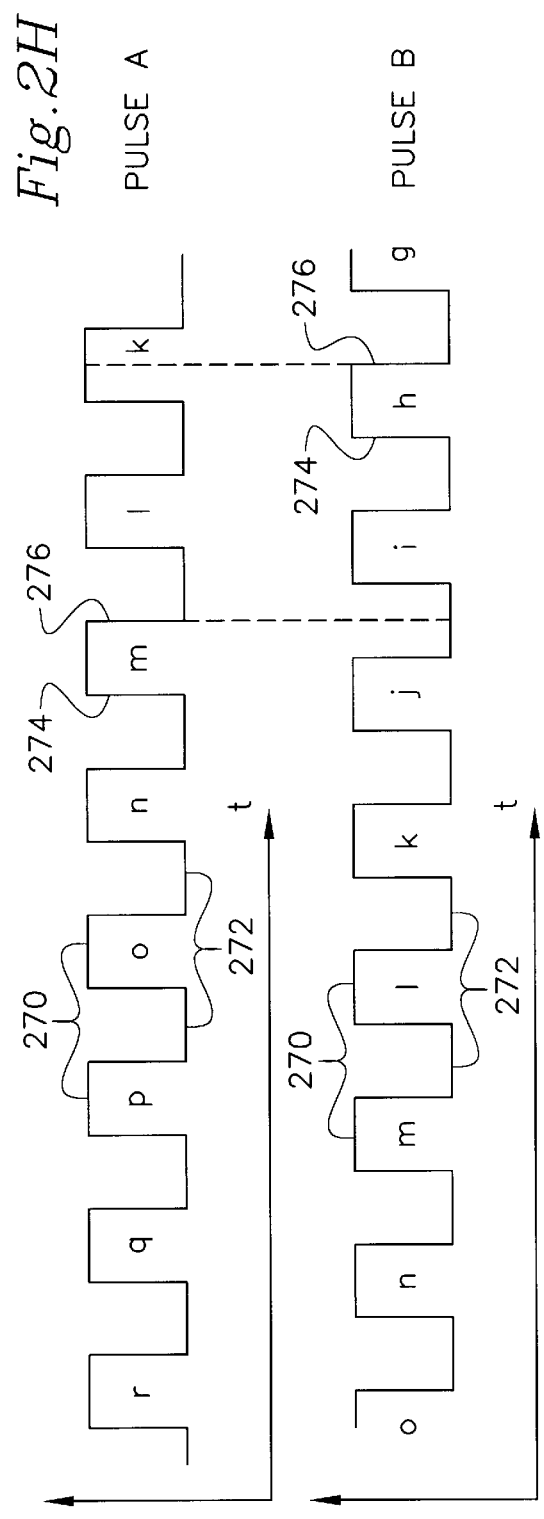

FIGS. 2c–2h depict a greatly enlarged view of a portion of a rotary encoder 120 having a circular interior disk 106 coupled to the axis of rotation 101 of a drum member 100, and FIGS. 2d and 2e graphically represent a set of electrical pulses produced as the drum member 100 rotates in a first direction with respect to rotary encoder disk 106. FIGS. 2f, 2g, 2h similarly show an encoder disk 106 and set of pulses produced, but in FIGS. 2f, 2g, and 2h the drum 100 is rotating in a direction opposite to the first direction depicted in FIGS. 2d and 2e. With reference to FIF. 2c, encoder disk 106 has a number of markings 250 which are relatively evenly spaced across the length of the periphery of encoder disk 106. Markings 250 on encoder disk 106 may be shaded lines, holes or other markings which can be read and translated into an electronic signal. Markings 250 may be photographically etched onto rotary encoder disk 106, may be printed or etched by a laser, or may be placed onto rotary encoder 106 by other means. Thus, markings 250 can be optically read by encoder disk reader 104 proximately coupled to the rotary encoder on the drum member 100. While only a small portion of encoder disk 106 bearing markings 250f–n is shown in FIGS. 2c–2h, encoder disk 106 and markings 250 continue across the entire periphery of encoder disk 106. Each of markings 250 has a left edge 252, a right edge 254, and a width 256 therebetween. Each pair of adjacent markings 250 define a spacing 258 between markings 250. Adjacent left edges 252 have a distance 260 between them, and adjacent right edges 254 have a distance 262 between them.

Ideally, each width 256 and each spacing 258 would be uniformly equal. However, encoder disk 106 and markings 250 thereon may have a number of inaccuracies. Width 256 may not be uniform among all the markings 250 on encoder disk 106. This inaccuracy may occur from physical damage, debris, or errors in fabrication of the markings 250. Particularly in a photographically etched encoder, these errors are manifest as a result of the a optical error in a photographic lens used in producing the encoder disk creates imaging errors which affect width 256. Errors in width 256 may further occur due to inaccurate or non-uniform fabrication, due to thermal shrinkage or expansion of the encoder disk, due to other aberrations in production, etc. As will be described in detail below, since these errors in effect form part of the printing control system, they typically cannot be ignored and in fact the present invention utilizes the signals produced as a result of these errors in adequately compensating the print controlled firing circuitry.

In addition to various uniformity errors in width 256, width 256 may not be equal to spacing 258 between markings 250. As shown in FIGS. 2c and 2f, each marking 250 may have a width 256 which is slightly smaller than spacing 258. With a photographically etched encoder disk 106, distances 260 and distances 262 are generally more uniform across the length of encoder disk 106 than either widths 256 or spacings 258. There may be further errors in encoder disk 106 such that distances 260 or distances 262 are not uniform along encoder disk 106. All of these encoder disk errors can lead to inaccuracies in dot placement on a printed image, if not appropriately handled. Of course, these types of errors could also be due to non-concentric mounting of the encoder.

Encoder disk reader 104 has two optical sensors, the location of which is represented by arrows 264 and 266, which are preferably shifted ninety degrees from each other. Optical sensors 264, 266 have a distance 268 between them. As will be explain below, distance 268 preferably positions optical sensors 264, 266 such that optical sensor 264 is in the center of a marking 250 when optical sensor 266 is at an edge 252, 254, and vice versa. When the carriage is traveling left to right as represented by the set of pulses in FIGS. 2d and 2e, left edges 252 are leading edges and right edges 254 are trailing edges. When carriage 88 is traveling right to left as represented by the set of pulses in FIGS. 2g and 23, right edges 254 are leading edges and left edges 152 are trailing edges.

Optical sensor 264 produces a pulse A, and optical sensor 266 produces pulse B. Both pulse A and pulse B are binary signals, with changes between high and low values corresponding with edges 252 and 254 as each optical sensor 266 passes over markings 250. Each marking 250 produces high value 270 when read by optical sensors 264, 266, and spacing 258 between markings 250 produces low value 272 when optical sensors 264, 266 pass over it.

FIG. 2e shows the pulses A and B as a function of time rather than a function of x-location. Each of high values 270 is again labeled according to the encoder disk marking 250 which created the high value 270. Because both encoder disk sensors 264, 266 are traveling at the same velocity at any given time, the durations of each high value 270 are similar at any point in time. However, the durations of high values 270 may change as carriage 88 minutely accelerates and decelerates during a print scan. FIG. 2e illustrates carriage acceleration across markings 250f–i, prior to reaching relatively constant velocity across markings 250j–n.

The direction of rotation of the drum member 100 can be determined from a comparison of the "leading falling edges" of pulse A and pulse B, as is known in the art. When the drum member 100 rotates in a first direction as represented in FIG. 2e, each falling edge 276 of pulse A occurs when pulse B is at a high value 270. In contrast, each falling edge 276 of pulse B occurs when pulse A is at a low value 272. Pulse A therefore has a "leading falling edge" when the drum member 100 rotates in a second direction.

The distance 268 between optical sensor 264 and optical sensor 266 remains constant regardless of direction of rotation, but now optical sensor 266 is in front. As can be seen in FIG. 2h when pulses A and B are mapped as a function of time, each falling edge 276 of pulse A occurs when pulse B is at a low value 272, and each falling edge 276 of pulse B occurs when pulse A is at a high value 270. Pulse B therefore has a "leading falling edge" when drum 100 is rotating in the first direction.

Figure 2I:
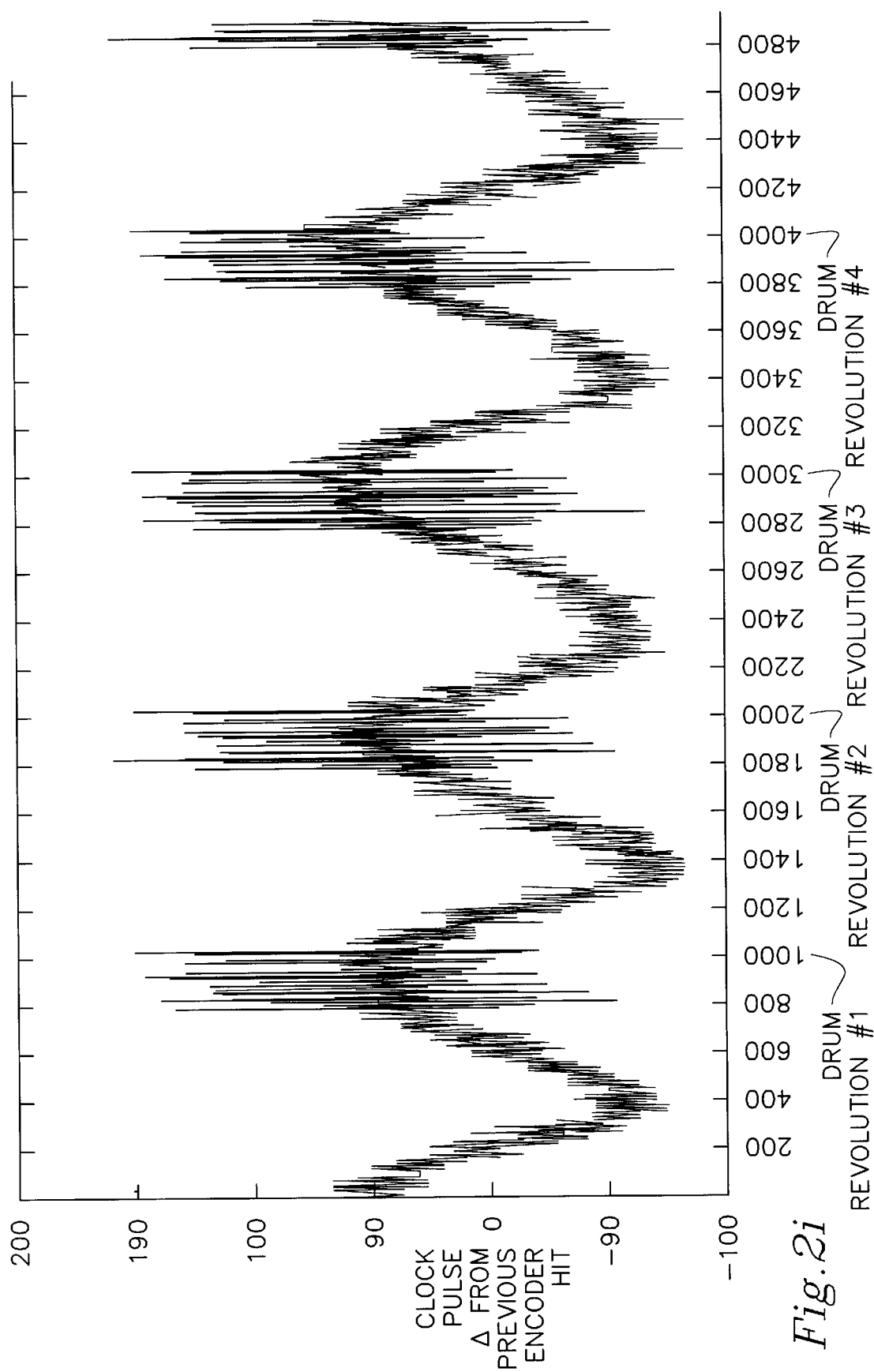
FIG. 2i depicts experimental output signals from a rotary encoder coupled to a rotating drum in accordance with the present invention—the spikes indicate likely damage to the encoder disk.

It should be understood that FIGS. 2d, 2e, and 2f are simplified for description purposes, and may not accurately reflect signals actually received in a particular configuration. For instance, pulses A and B are shown as square signals with little or no noise. As can be seen in FIG. 2i, which depicts a plot of actual testing data, the actual signal may include significant noise and require filtering to arrive at a square signal. Resolution of pulse A can be increased by interpolating the timing of pulse A against a timer. Pulse A might thus be generated such that it changes from high to low or vice versa at two, three or four times the rate of leading edges on encoder disk 106. In any event, workers skilled in the art will recognize that various methods of creating pulses A and B from the encoder disk reader 104 may be employed. Workers skilled in the art will recognize that methods other than encoder disk 106 and reader 104 exist by which to produce a signal indicative of the direction of rotation of the drum member 100. The present invention is applicable to adjust any such signal indicative of carriage location with respect to a parameter of the printer.

To aid in simplicity of calculation, it is preferred that the carriage be driven such that print heads 80–87 has a uniform velocity across the entire image. With a multiple print head system, it is preferred that the uniform velocity be maintained at all times that any print head 80–87 is over the image. In the preferred embodiment printer 10 with image sizes up to 50 inches with print heads 80–87 and an offset of approximately 3.9 inches between the first and last jets 98 of the first and last print heads 80–87, a section of constant velocity when any of print heads 80–87 is above the image. The total travel of carriage during printing includes approximately another six inches beyond each side of the image for carriage 88 for locating a print head "service station" for maintaining the print heads in operable condition.

Figure 3:
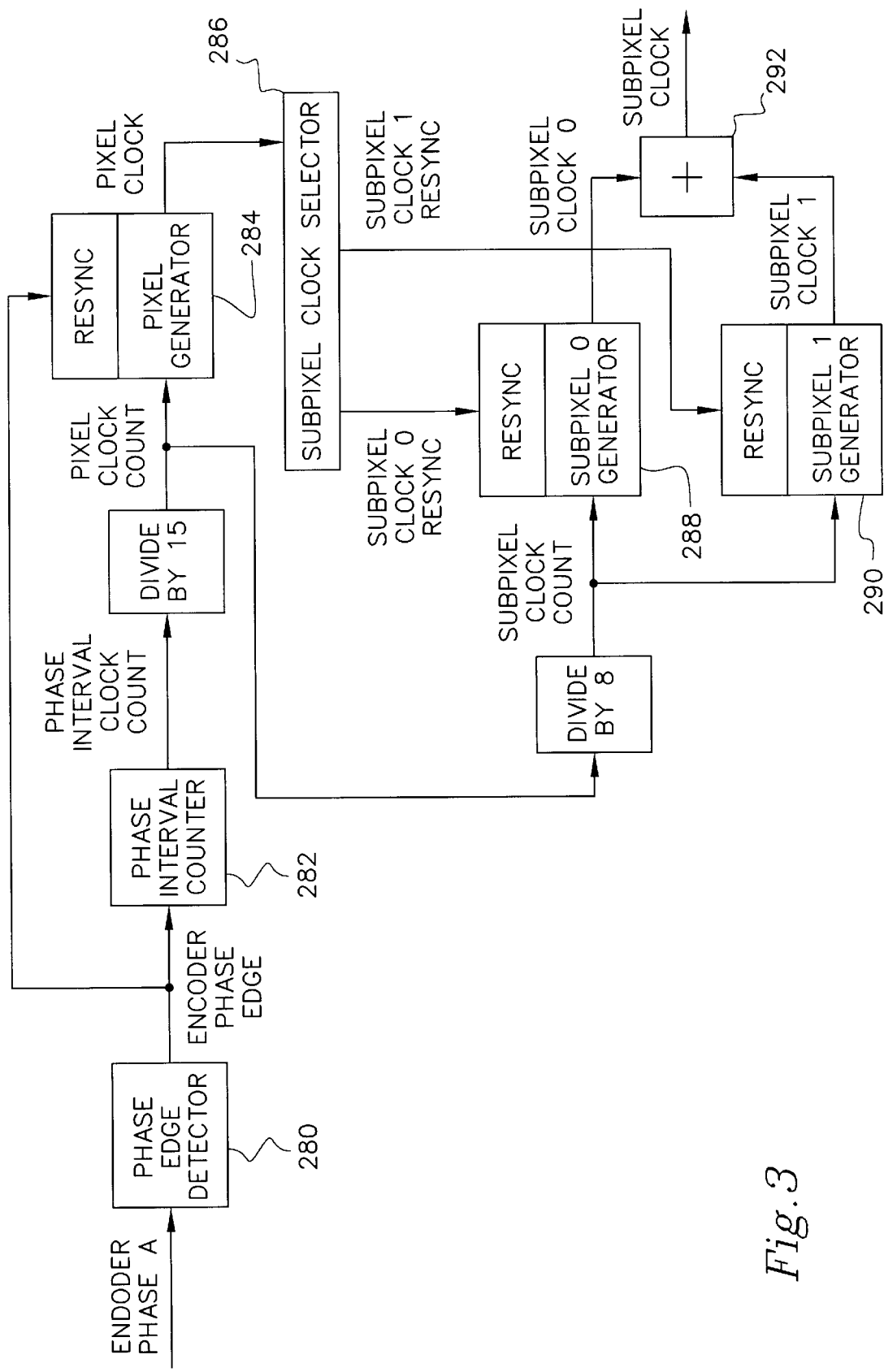
FIG. 3 is a block flow diagram of the pixel synthesis logic of the present invention operating upon a signal from the encoder phase A signal.
Figure 4A:
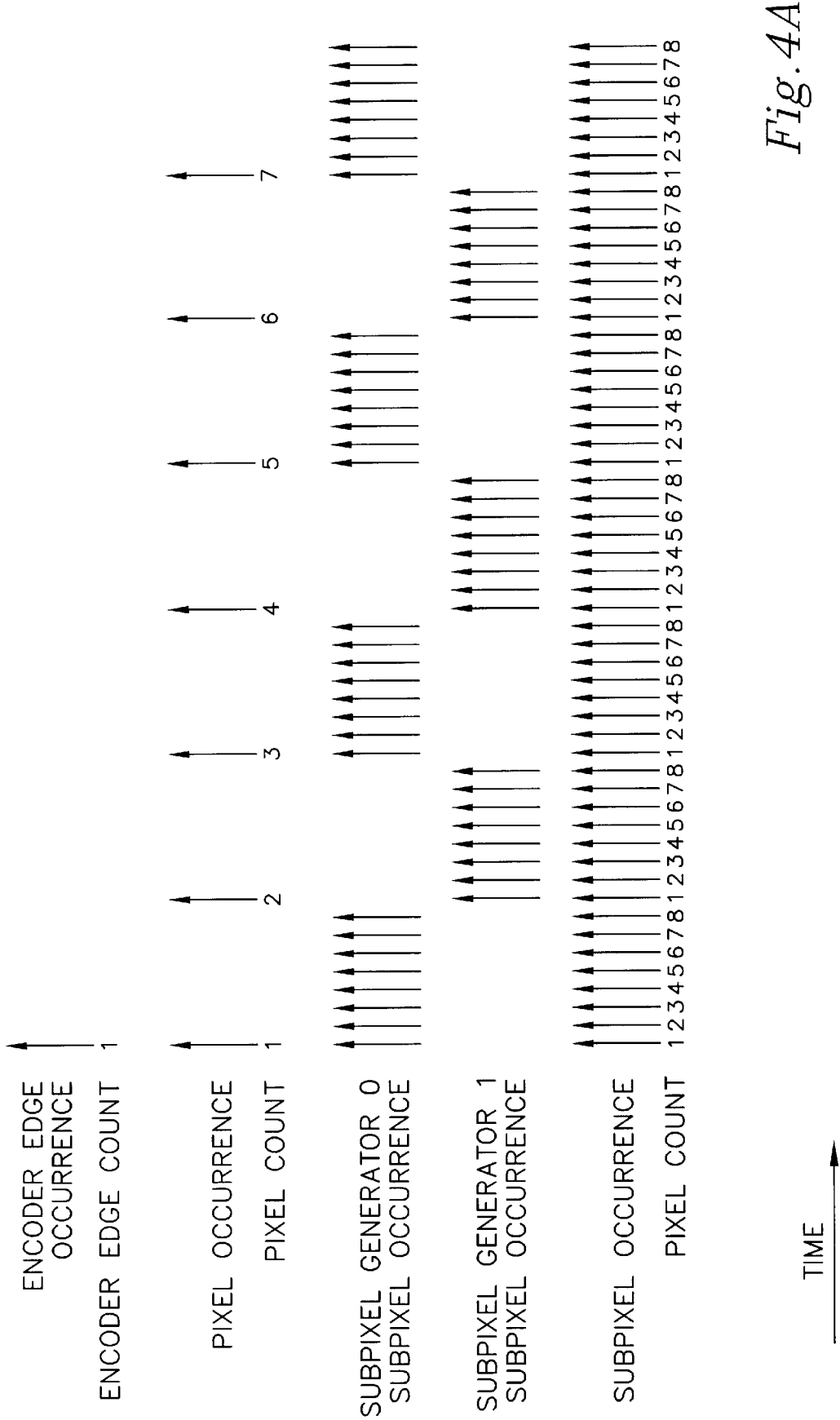
FIG. 4 depicts the pixel synthesis digital logic signal output during a short time window of operation.
Figure 4B:
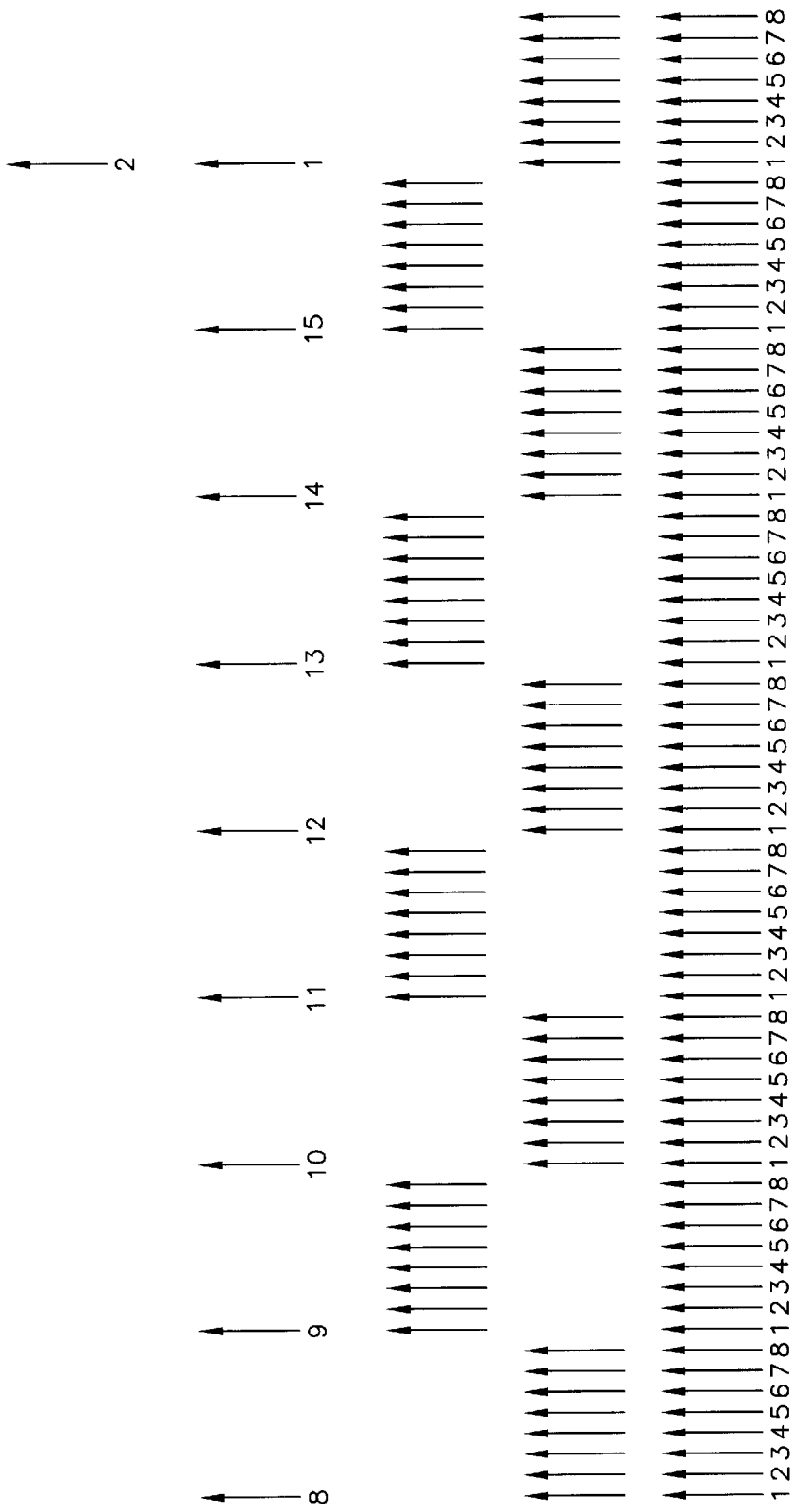

FIG. 3 is a block diagram indicating the pixel synthesis logic mechanism used for print head firing in accordance with the present invention. Printer 10 conceptually includes a phase edge detector 280, a phase interval counter 282, a pixel generator 284, a sub-pixel clock selector 286, two sub-pixel generators 288,290, all of which are interrelated as will be described hereinbelow. Each of these elements 280, 282, 284, 286, 288, 290 may occur in a microprocessor, may occur in hardware, or may be otherwise implemented into the circuitry for printer 10 as desired.

Figure 9:
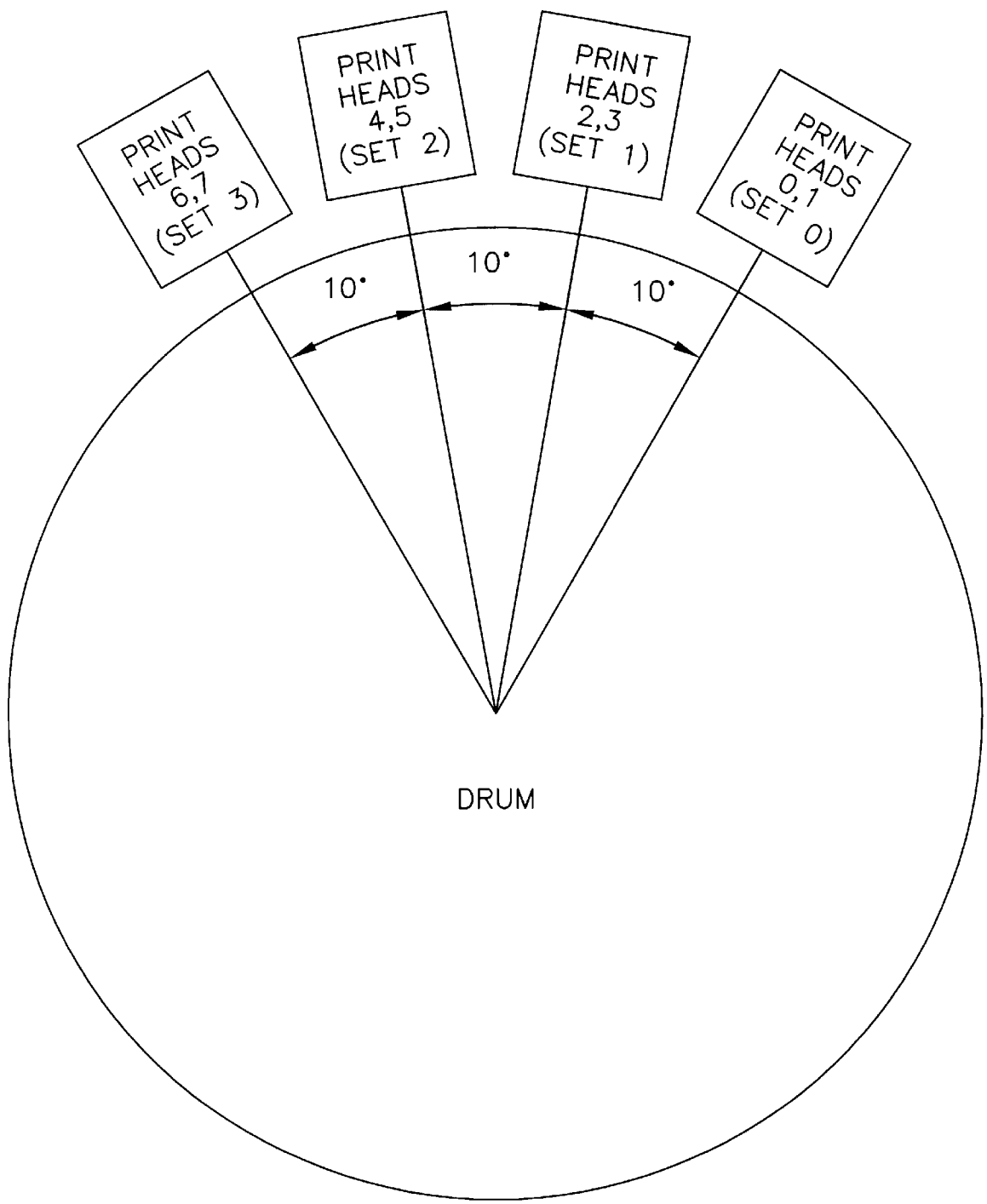
FIG. 9 depicts an example of the present invention illustrating the radial separation between a preferred print head arrangement for use with the present invention, wherein eight print heads are oriented in two parallel rows of four print heads each and each adjacent head is offset from the next adjacent head, and each of two print heads are disposed ten degrees from the next of two print heads.

As seen in FIG. 9, during the development of the present invention if the inventors ignored registration error among cartridges as some are replaced during normal service operations on the print engine, that since the print heads are all fixed in place, print head (head1) 80 has a fixed relationship to the second print head head1 81, an to each of the eight print heads of the preferred embodiment numbered 80–87. Thus, horizontal position and vertical position adjustment are unnecessary since the head0 firing position determines all subsequent head firing positions. Thus, in this example, the horizontal and vertical position adjustments for all other print heads 81–87 need be determined simply based on their nominal physical offset from print head (head0) 80. It must be noted that presently the inventors have progressed to a new absolute synthesized position and do not in the preferred embodiment herein practice the method of he instant example. However, in this example where the print heads are paired in their preferred orientation of four rows of two print heads each so that print head (head1) 81 has only a limited axial offset and no radial offset from print head (head0) 80. While not the case for the preferred inertial drum mapping technique as taught and claimed herein, in this example the head0 position dictates the correct firing timing for all other print heads 81–87 at the common position 298.

The determination of which ink jets 98 on the print heads 80–87 are to be fired for each fire pulse is performed by head control circuit. Source image data is placed into an image data buffer 312, which may be a two-dimensional look-up table. Based on head1 position, head1 control computes the x- and y-address of each ink jet 98 on head1 81. Head1 control then references image data buffer and determines a printing word 314 to be subsequently (following appropriate delay for the amount of separation between the two print heads) printed by the head1 81. The printing word is a binary command with one bit for each ink jet 98, instructing each ink jet 98 to fire or not to fire on a given fire pulse. This printing word 314 is used such that the desired jets 98 of head1 81 print based on timing of adjusted pulsel 318.

The overall velocity of an ink droplet relative to a printing medium is a function of the firing velocity from the ink jet 98, the velocity of the print medium residing on the drum member 100, and the slew rate of the carriage 88. Ink droplets have a z-direction velocity imparted by ink jet 98, generally propelled perpendicular to the printing medium, have an x-direction velocity equal to the x-direction velocity of carriage 88, and a y-direction velocity component relative to and proportional to the rate of rotation of the drum 100 (generally expressed in inches per second or ips). The x-direction velocity causes an ink dot to contact the media 28 at a significantly different x-location than the x-location of the ink jet 98 at firing. Particularly if the velocity of carriage 88 increases to achieve faster print rates, this x-direction velocity cannot be ignored in accurate positioning of ink dots on the media 28. Since the rate of rotation of the drum member 100 and the slew rate of carriage 88 are related in a preferred embodiment so that for every one inch of translation of the carriage assembly 88 the drum member rotates and thus, the velocity of carriage 88 is proportionate to the rate of rotation of drum member 100. An upper limit of rotation presents a corresponding restriction on the slew rate of the carriage assembly of the present invention due to unpredictable droplet trajectories, droplet satellites, and other deleterious effects of such increased speed. In order to adequately compensate for all these and the above-noted factors, it is preferred to calibrate and correct registration at the same speed settings used during routine printing operations. As will be appreciated in regard to the inventive rotational registration compensation method hereinbelow, a greatly increased rate of rotation offers significant advantages in accuracy when compensating specifically for the encoder run-out phenomena mentioned herein.

The drive motor control circuit preferably operates a low cost low torque electric motor coupled via a timing drive belt to drive gear which couples to a cooperating nut fixed to propel carriage 88 at a steady velocity across the width of the printing path of print engine 10. The motor 64 preferably includes an internal rotary encoder, as are known to workers skilled in the art, to accurately control the drive gear of rotation of carriage drive motor 64. As known in the art a PID or other control loop may be used to control the voltage applied to carriage drive motor 64 to see that position, velocity, and acceleration of carriage 88 are all maintained as closely as possible to a desired constant velocity.

Because of the relative fixed relationship between and among the print heads 80–87, and between the drum and the carriage, and the constant speed of carriage during printing, no x-direction velocity component of carriage 88 nor y-velocity component of reciprocating printing medium 32 introduces error which must be addressed or compensated among the print heads. Thus, even if due to various errors carriage 88 does not exactly follow a desired velocity, no further adjustment is necessary to produce highly repeatable printed locations for placement of ink droplets. Likewise, sticking points or tight spots on rail 32, imperfect bearings for rollers 90, errors in the belt drive systems of carriage drive motor 64 and drum member drive motor and other similar concerns do not contribute to any instantaneous or non-repeating error requiring correction or compensation. Note that if all print heads 80–87 are carried with no rotational offset on a single carriage 88, a single adjustment may be made to the timing of firing of the other print heads based on the known temporal delay between the time a first print head 80 and a next printing print head are proximate the same precise location on printing medium 32 to accurately dispense ink droplet(s) thereon. This simple temporal adjustment would apply equally to all print heads 80–87.

Figure 13:
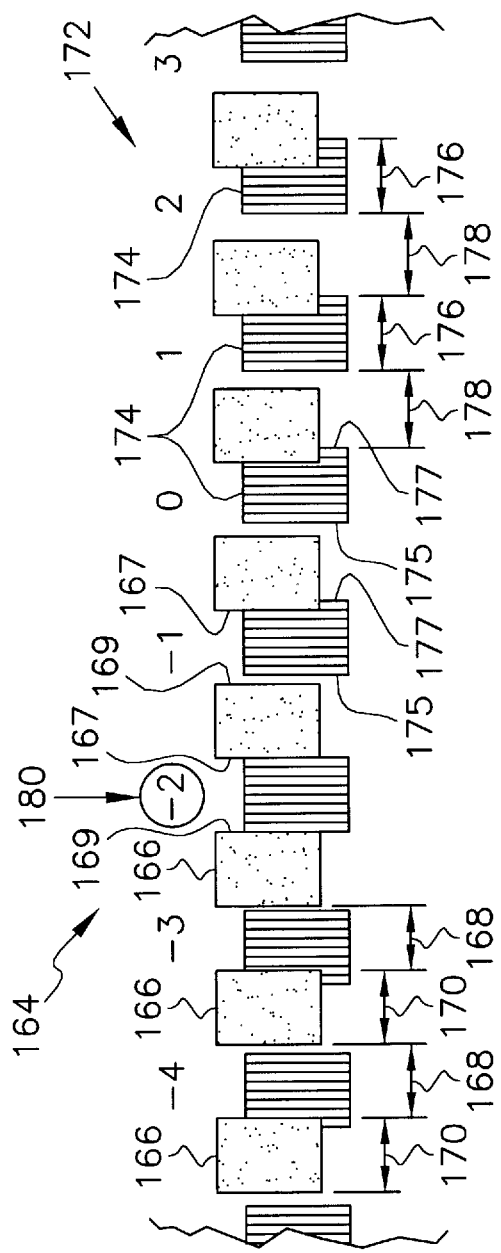
FIG. 13 depicts a discrete calibration pattern for two print heads each expelling different color inks.
Figure 14A:
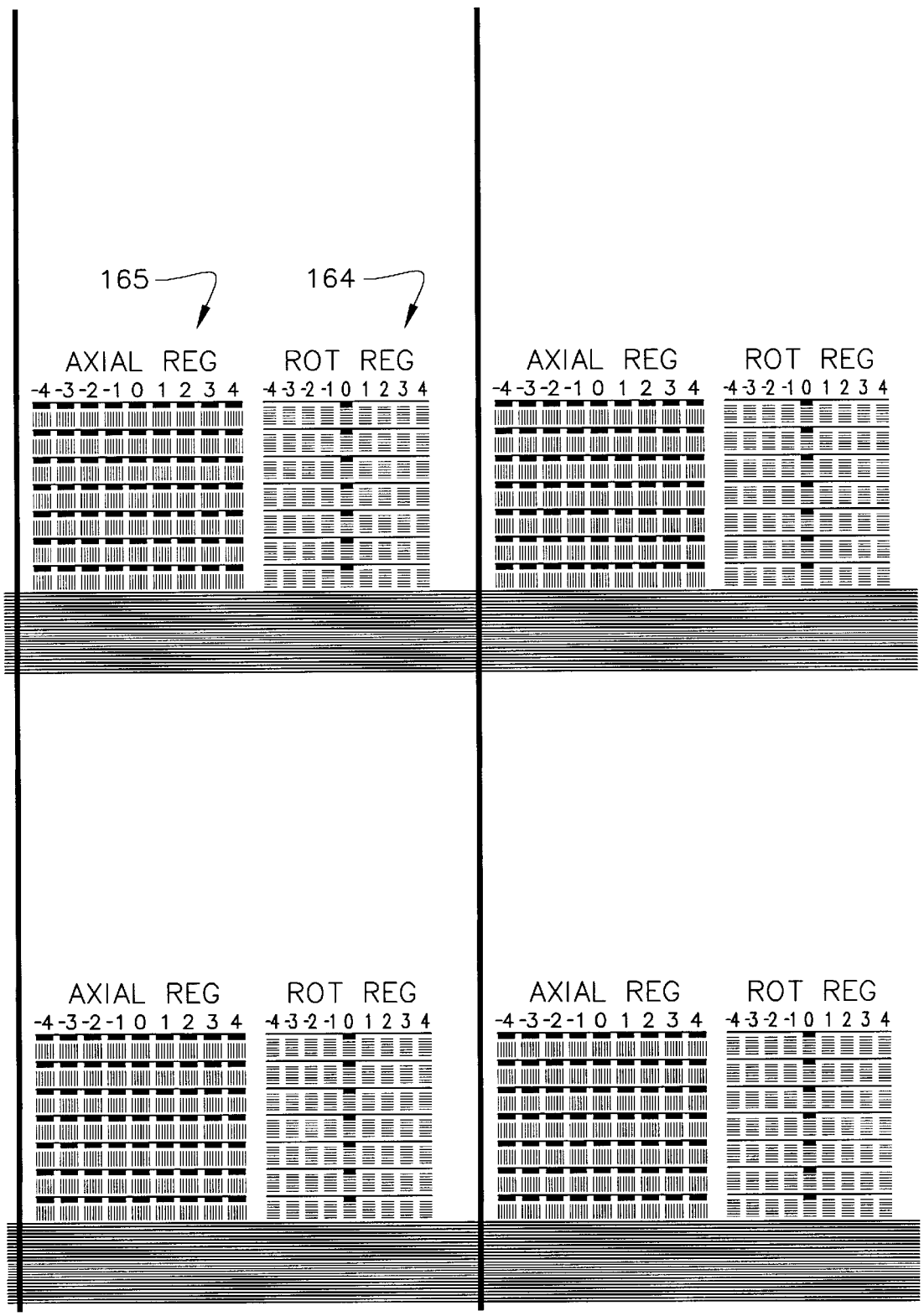
FIG. 14a depicts a set of four pairs of calibration patterns, one for axial registration and a second for rotational registration among an eight print head embodiment of a print engine operated in accordance with the present invention.
Figure 15A:
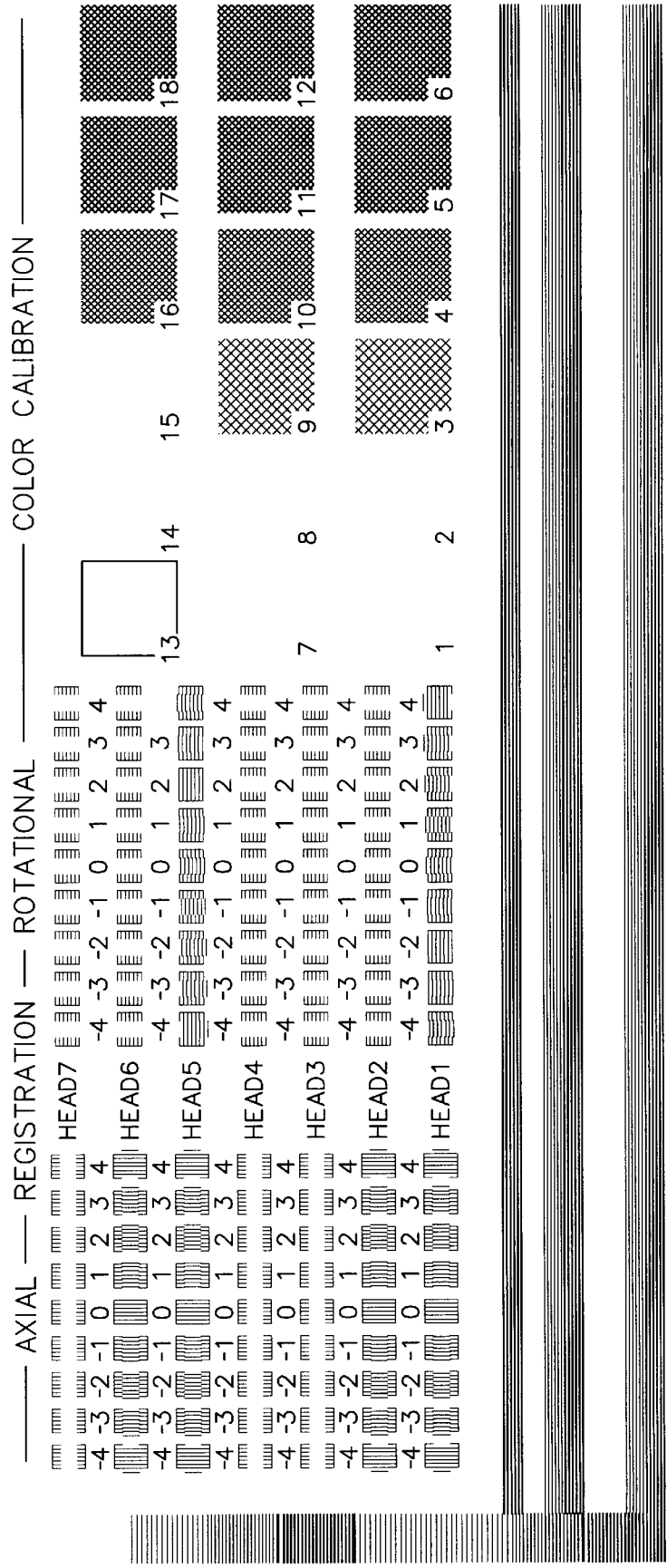
FIG. 15a depicts a set of eighteen color calibration panels and a pair of calibration patterns, one for axial registration and a second for rotational registration among an eight print head embodiment of a print engine operated in accordance with the present invention.
Figure 16:
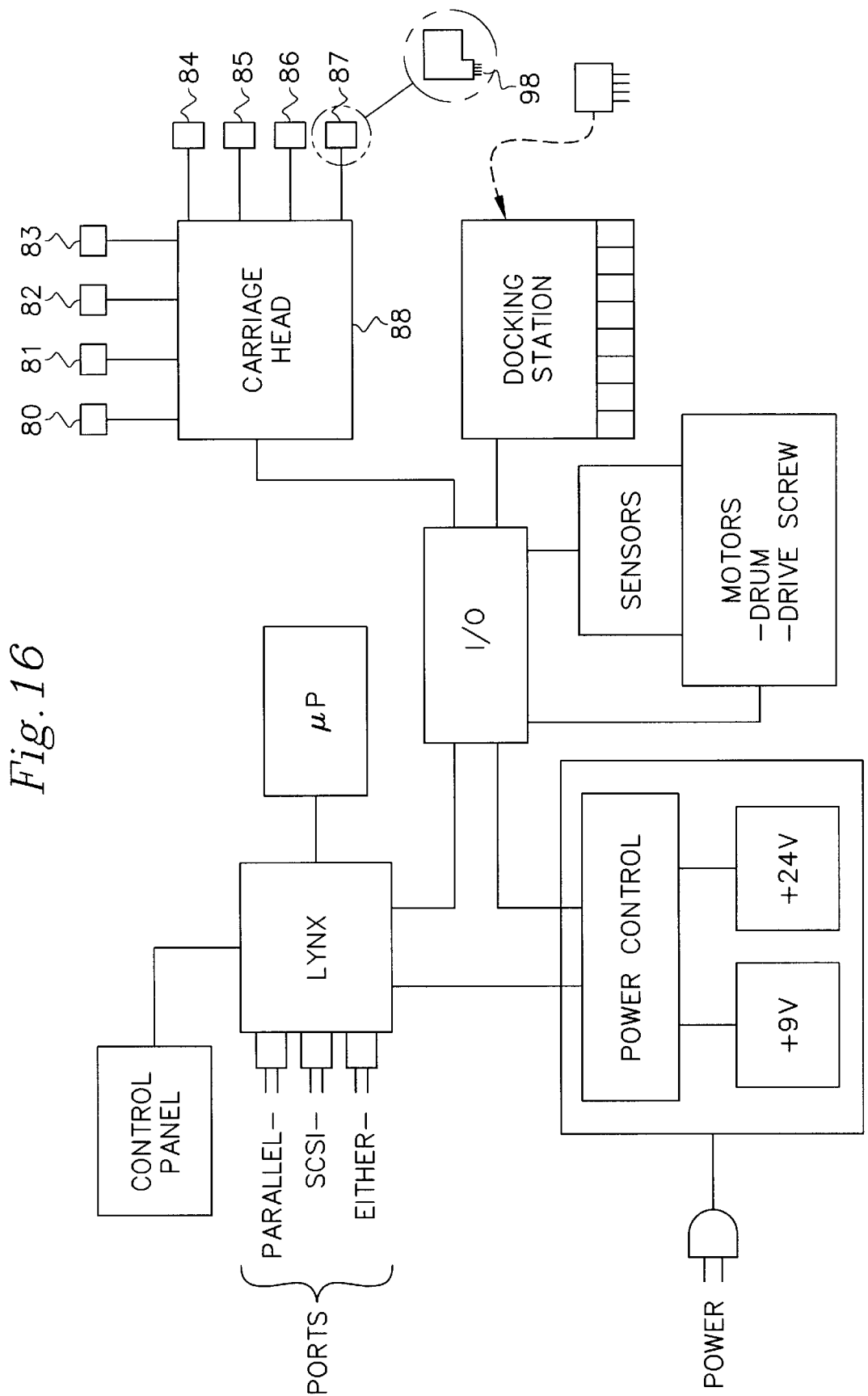
FIG. 16 depicts an electrical block diagram of a preferred embodiment of the present invention.

FIG. 13 is an enlarged calibration pattern 164 for the print head configuration. Calibration pattern 164 is used to calibrate rotational timing of each color in relation to the other colors. As seen in FIGS. 14*a*, 14*b*, 15*a*, and 15*b*, a similar calibration pattern 165 laid down in the axial direction can be used to calibrate vertical placement of each color in relation to the other colors. In creating such a calibration pattern 164, a pattern of marks or blocks 166 of a first color (in this case black) are laid down. Each of blocks 166 has a uniform distance 168 between them. Additionally, each block 166 has a leading edge 167, a trailing edge 169, and a uniform thickness 170 between leading edge 167 and trailing edge 169. With uniform distance 168 and uniform thickness 170, both leading edges 167 and trailing edges 169 are uniformly spaced. It is preferred that blocks 166 have a thickness 176 which is equal to distance 168 between them, such that blocks 166 shade in one-half of the area along the test pattern 164. Index 172 is also printed to designate calibration settings along calibration pattern 164.

A second row of blocks 174 is printed with a subsequent color (in this case, magenta) on carriage assembly 60. Second color blocks 174 each have a uniform thickness 176 between leading edge 175 and trailing edge 177. Thickness 176 is equal to the uniform distance 168 between first color blocks 166. The spacing 178 between second color blocks 174 is slightly different than the spacing 168 between first color blocks 166. As shown, the spacing 178 is greater than spacing 168. Because of this difference in spacing, the second color blocks 174 line up with the first color blocks 166 at a single location 180. This calibration location 180 is readily identified because blocks 166, 174 completely shade this section of test pattern 164. This calibration location 180 is similarly identified as the only location wherein leading edge 175 of second color block 174 lines up with trailing edge 169 of first color block 166. The remainder of test pattern 164 has blocks 166, 174 which extend over each other so as not to completely shade pattern 164.

Alternatively, calibration patterns 164,165 may be printed such that the proper calibration location occurs where second color blocks 174 completely overlay first color blocks 166. In this case, the calibration location may be identified as the only location wherein leading edge 175 lines up with leading edge 169 of first color block 166, and no unshaded portion of second color block 174 is seen to either side of first color block 166.

Calibration patterns 164,165 can be read either by the user or by automated equipment (not shown). Automated equipment for reading calibration patterns 164,165 may merely determine the percentage of shading as a function of location on calibration pattern 164. Similar calibration patterns can be laid down for the calibration for the remaining colors, both vertically and horizontally. In contrast to previous calibration techniques, overlaying the calibration marks and total shading provided by the proper setting leads to a significantly easier determination of the proper calibration setting. It should be noted that blocks 166, 174 may be printed by the same printer head or by different printer heads, depending on which colors are being calibrated. It should further be noted that at most only a single full-width pass of carriage assembly 88 is required to print blocks 166, 174 as well as many additional blocks corresponding to each ink color and/or each print head if more than one print head contains the ink of the same color. Numerous jet nozzles 98 may be used in printing blocks 166, 174 during numerous revolutions of the drum member 100, but only a single pass of carriage assembly 88. By properly selecting the. size and orientation of blocks 166, 174, calibration may be achieved between all the various jet nozzles 98 of the print heads 80–87 disposed on the carriage 88.

Upon determining the proper calibration location 180 for each color (both horizontally and vertically), the calibration location 180 can then be adjusted in software to alter the firing of jets 98. For instance, if the proper calibration of the second color is 2 horizontal pixels off, the second color may be fired 2 pixel locations earlier (or later depending on the direction of the error relative to a central reference pixel) during the print head pass during printing of an image. Similarly, if the proper calibration of the second color is 1 vertical pixel off, the information fed to the second color jets may be modified such that they print one pixel lower within the image. The proper calibration information may further be extrapolated to make corrections amid lines of same color jets 98. In this way, for instance, the first set of black jet nozzles may be adjusted by one pixel relative to a second set of black jet nozzles residing on a second cartridge filled with black ink.

The inventors have discovered that the entire exterior surface of the drum member 100 may be adequately characterized for drum surface anomalies, balance discrepancies, and to a degree crowning or sag of portions of the drum surface or the rail which supports the print carriage assembly 88 and correction for non-concentric alignment of the respective encoder and drum axes of rotation makes these items a separate effect. In a preferred embodiment, while the drum member 100 rotates at a preselected printing velocity, a plurality of pairs of calibration patterns are printed radially and axially over a printing medium attached to the drum member 100. In one embodiment, ten axial rows and twelve radial columns, for a total of 120 calibration pattern pairs are more or less evenly distributed over the printing medium. The patterns are then either manually read and compared for an appropriate match as described above or subjected to automated pattern recognition devices, with the best fit values entered into an appropriate location for controlling print head firing sequence(s).

A surprising and more expeditious development related to this calibration technique was also discovered by the inventors of the present invention; namely, that adequately compensated print head control signals can be derived from just calibrating the surface of drum member 100 with just a single printed calibration pattern row and a single column. Thus, perhaps because of the periodic nature of detectable errors related to the surface of a rotating imaging drum, such as drum member 100, or other reason, a simple and effective factory calibration method for characterizing the surface of a drum based print engine has been discovered and is now taught and enabled hereby.

Upon further reflection and statistical analysis, the inventors found the following:

1. If drop velocity is the same on all heads then drum run-out and paper bubbles have no effect on registration, it just distorts the image in the same way and with the same effect for all heads.

2. If drop velocity varies head to head then the register shift is:

deltaR=PaperSpeed*deltaH*(1/V1−1/V0) or, to put some real numbers in, if a large size air bubble (say 0.040 in.—which is enough to cause nozzle strike) and a bad difference in drop velocity (say 3 meters/sec difference centered on 7.5 m/s nominal so 6 and 9 m/s) and 100 ips paper speed (high quality mode) the register shift is 5.6 mils or 1.7 pixels. I think that's not too bad for a worst case, and in any event there is nothing we can do about it assuming we aren't going to calibrate the bubble. Drum run-out can be calibrated out even with differences in drop velocity. The printing medium may even bridge the "drum run-out."

If one imagines that the encoder is perfect (or perfectly compensated for) and at least one nozzle is fired on each head on each encoder pulse, each drop lands a distance L downstream from where it was fired.

L=paper speed*time of flight (T)

T=head spacing (H)/drop velocity (V)

Since spacing among the print heads is a function of which head (h) and absolute circumferential position (x) (x is a particular circumferential spot on the drum), so we have H(h,x). That is, H(h,x) is the head spacing for head number h when absolute spot x is under the head. Velocity is a function only of which head is emitting ink, and is assumed to be a common value for each print head. Paper speed is a constant 100 ips. T(h,x)=H(h,x)/V(h)

Now adding a time delay for each head (D(h)) between the encoder pulse and the fire pulse for each head. Then L(h,x)=100 ips*(T(h,x)+D(h)), and for some value of x, we have a fixed time of flight for each head and so we can choose some delay for each head which will cause all the drops from each head to land on the same spot. For example, L(h,x)=100 ips*(H(h,x)/V(h)+D(h)).

The dot placement changes as a function of circumferential position:

deltaL(h,x)=L(h,x)−L(h,x0) which if you do the algebra is deltaL(h,x)=100*deltaH(h,x)/V(h)

But, since deltaH as a function of x and is identical for every head (it's the run-out), so deltaH is a function of x only: deltaL(h,x)=100*deltaH(x)/V(h)

Now it can be appreciated that if all heads have the same drop velocity, then deltaL is not a function of head either: deltaL(x)=100*deltaH(x)/V That is, all heads have the same shift in dot position as a function of circumferential position, so although there is an absolute position shift, there is no relative (color to color) register shift.

However, if the heads do not have the same drop velocity then the color to color register shift (deltaR) is: deltaR(h,x)= deltaL(h,x)−deltaL(h0,x), which if you do the algebra is: deltaR(h,x)=100 ips*deltaH(x)*(1/V(h)1/V(h0))

For capturing encoder run-out information from print engines progressing down a production line, it was suggested that one could apply mathematical concepts of trigonometry and geometry to the rotary encoder, drum member, and related print system subassemblies and determine exactly how far off the exact center of rotation of the drum member the encoder is located. By deriving timing information in view of the known physical dimensions of the encoder setup the inventors recognized this surprising result as a very useful tool for final production checkout. The inventors use the time elapsed between encoder ticks to map out a sinusoidal "correction factor" (also assuming a constant drum speed, but by using regression analysis you can filter out some speed variances like constant acceleration and deceleration). The graph depicted in FIG. 2e, illustrates the relationship discovered by the inventors. Also, during the course of testing and applying this concept, the inventors observed seemingly spurious noise "spikes" shown in the FIG. 2i. This seems to directly relate to a damaged encoder disk, and in fact the inventors verified that the same encoder disk tested was one that they tested on a test bed for several months, thus supplying ample opportunity for verifiable damage to the encoder disk. Thus, the inventors determined to record this data on every production unit during the manufacturing process.

Another possibility is to use the drum mapping information to add in a drum encoder interval factor to reduce the effect of the interval spikes on the pixel synthesis. Large changes between adjacent encoder intervals can cause the synthesized pixels to be non-uniform. Use of such an encoder could be used to simulate an ideal encoder signal.

Thus as a direct result of experimentation with the idea discussed hereinabove, namely of running the drum at some steady speed and measuring the time between encoder pulses as a possible way to determine encoder errors, has proven to have merit. The Physics related to the higher rotational velocity dictate that the predicted rotational speed will be closer to an actual speed and inaccuracy related to any dynamic imbalance to drum member 100 can virtually be ignored. The predicted and experimentally proven rotational speed is approximately four times (4×) the typical printing speed. Given a typical printing speed of a preferred embodiment of the present invention of eighty inches per second, for the encoder run-out process just described, a rotational velocity of approximately three hundred-fifty inches per inch works adequately. One of skill in the art will recognize that these values may be adjusted, and simply represent a single embodiment of the process just described. Thus, the present invention addresses the possible situation wherein the drum member was not perfectly balanced, so that a sinusoidal torque on the drum forms due to gravity, and this would also contribute to the variations in encoder pulse timing. Roughly speaking, the drum position variation due to gravitational forces on a possible imbalance diminish with the square of the rotational speed. So as predicted, the faster rotation the drum, the smaller this balance factor should be, and through experimental verification, proves to be. Thus, the steps to implement the encoder run-out method just described include the steps of:

1. Spinning the drum member to some speed and let it run there to allow the rotational velocity to settle to a more or less constant value.
2. Interrupting the servo loop to the motor for the drum member and hold the last (stable) drive level for a period of time, not less than a select number of seconds.
3. Allowing the drum member to spin around fifty or more times—enough to make sure the speed is as steady as it's going to get.
4. Measuring the time between encoder pulses and average for 10 revolutions.
5. Assuming the drum member was in fact spinning at an exactly constant speed and then using the measured variations in encoder pulse timings,
6. Calculating the encoder pulse position errors which are assumed to be responsible for the timing variations.

The inventors experimented with this technique at several rotational velocity values for the drum member ranging from 18 to 400+ ips and then plotted the encoder errors calculated from the data from each run. Consistent with the physics of the system, the faster the rotational speed of the drum member the closer the curves all with respect to each other. In fact all the curves from 160 ips through 400 ips fall pretty much on top of each other. The curves are smooth and have very little "noise."

To cover the case where the tested drum members might just happen to be perfectly balanced, the inventors connected a 20 gram mass to a location on the surface of the drum member. This mass was chosen to roughly approximate the limits of the predetermined specification for the balance of the drum member. When the same series of tests were run again the results for the fastest two or three speeds of the newly "unbalanced" drum member were again right on top of the best curves for the balanced case. Thus, it seems that one can rotate the drum member fast enough to overcome any error generated due to an unbalanced drum. What does this mean in terms of the present invention as taught and enabled herein? It means that one can capture this run-out data and thereafter print with perfect register all around the drum.

Another interesting aspect of the present invention bore out by experimental verification, that the encoder error is very sinusoidal in nature, but on some print engines can be as large as twice the amount as the run-out on other print engines. However this phenomena can be depicted as. a sinusoidal trace with a boss, or "wart," and a couple of spikes typically centered at or near an arbitrary point of a complete revolution of the drum member. The inventors suspect this phenomena arises as a result of imperfections in the rotary encoder disk, such as might be created if there were a "ding" or other discrete error in the encoder disk. The inventors thus suggest a manufacturing assurance test where the data out of a machine is captured during production at the high rates of rotation earlier noted. This can be routed through and captured as an output signal on a serial port output. Then manual review of the encoder error plotted for each machine—before it ships—should show up marginal encoders very clearly so they can be replaced prior to shipment, and a maximum runnout manufacturing specification value may be created so that only print engines capable of adequately compensating for their unique build characteristics reach an end user.

To reiterate, the relatively constant x-direction velocity of carriage 88 introduces virtually no error which must be addressed or adjusted with respect to anything other than a single reference print head, as described above, head0 in the embodiments described herein. Due to the common set of underlying printing criteria affecting all print heads equally, any variation in velocity of the carriage assembly 88 will likely occur each time carriage assembly traverses the width of the printing medium, and therefore the time of flight (TOF) and other considerations regarding the trajectory of each individual ink droplet need not be addressed. This holds true even if the carriage does not exactly follow a constant velocity profile, since it prints in only one direction of motion of carriage 88 but rather is subject to small, instantaneous accelerations and decelerations, including sticking points or tight spots on the rail 32, imperfect bearings for rollers 90, errors in the drive systems for belt drive of carriage drive motor 64 and drum member 100 drive motor and other similar causes contribute to an instantaneous small velocity error. Accordingly, it is preferred that the velocity of carriage 88 be monitored and controlled closely, but such monitoring and control are inherently not required in practicing the present invention.

Some error occurs with regard to multi-pass printing on a rotating drum member. As discussed above, a delay time which occurs between sensing an encoder disk marking and placing an ink dot on the media. This delay time is largely due to the flight time of the ink dot, but may further be due to electromechanical firing delay of the ink jet. In drum-based printing engines, the delay time affects placement of the ink dot in different directions based on the direction of print head travel and the drum movement. As a result, the carriage assembly of the present invention preferably carries all relevant print head control circuitry, adequate memory storage for a suitable frame buffer, and electrical traces of more or less even length to minimize temporal delay due to inherent electronic delay from differing length electronic pathways.

Another source of error that can be addressed in a pulse adjustment circuit arises as a result of non-uniformity of the drum surface. This can be defined as any variation in the distance between ink jets 98 and the surface of the drum member over any single point of the drum, and with respect to each print head used to print an image thereon. In a perfect mechanical system, the distance from heads to drum would be maintained at a constant value, and the position of printed ink dots on the media 28 would be highly predictable. However, complex, full color, wide format print engines such as the present invention are in practice rarely mechanically perfect, in fit, tolerance, or alignment. A typical drum member may have warpage, curvature, centered or uncentered crowning, and a lack of adequate, (i.e., perfectly concentric) encoder alignment on the axis of rotation of the drum member or other manufacturing and assembly tolerance errors, either from initial manufacture, or from later replaced components and subassemblies such as print cartridges, printing medium, carriage or rail components. Likewise, a multi-print head carriage assembly contributes even more potential error to overall unpredictability, since each print head must be roughly calibrated during manufacture to a print head cartridge specification, which may or may not meet the respective manufacturers specification. Preferably, Hewlett-Packard disposable ink jet cartridge model #51626A comport with the needs of the present invention. Furthermore, the carriage assembly and the rail assembly 32 could also have significant alignment discrepancies. These problems affect printing quality as follows. As explained above, ink droplets fired from nozzles 98 on moving print heads 80–87 have an x-direction and y-direction velocity component relative to the printing medium traveling orthogonally to the print heads which cannot be ignored. The location that an ink droplet contacts the media 28 (x) is dependent upon the firing location ($x_{firing}$), upon both the x-direction velocity of the ink droplet ($v_x$), and upon the travel time of the ink droplet (t): $x=x_{firing}+(v_x \times t)$. The travel time of the ink droplet is dependent upon the y-direction firing velocity of the ink droplet ($v_y$), upon the distance between the ink jet 98 and drum member 42 ($d_{platen}$), upon the media thickness ($t_{media}$): $t=v_y(d_{platen}-t_{media})$, and upon any additional dimensional variance of the surface of the drum member from the value ($d_{platen}$). Accordingly, if the distance between the ink jet 98 and the drum varies from location to location one or more portions of the surface of the drum member 100, this difference potentially causes positioning errors in the placement of ink droplets that must be corrected to print output of the highest quality.

In the preferred embodiment, this diagonal positional effect is addressed in software control circuit. The amount of any variation in distance between the drum and the print heads resident on the carriage is measured during manufacturing of printer 10, recorded, and entered into the control circuitry as a correction factor, as further described hereinbelow. The positional effect may be stored in two-dimensional look-up table (LUT) for reference and application by control circuitry preferably based on the application of a suitable combined drum surface variation tracking mechanism and registration suite interconnecting the relative mechanical location among each of a plurality of print ejecting nozzles associated with each of several print heads residing on carriage and a print-bearing rotating drum. A first mechanism for achieving compensation of only the effect due to encoder run-out employs a method wherein the drum member accelerates to an increased rate of rotation, maintains a monitored level rate of rotation, while recording the difference in time between successive pulses produced by the rotary encoder 120 coupled to the axis of rotation of the drum member 100.

To reiterate, in practicing a preferred embodiment of the present invention, both rotary encoder inaccuracy and drum member surface irregularities are measured and compensated during manufacture of print engine 10. While these steps during manufacture of the drum-based print engine of the present invention, part of the errors may be due to human error, or component mismounting, or other factors such as environmental parameters like printer temperature, humidity, mounting error, etc. These or other errors of printer 10 may be more accurately corrected by installing a sensor to calculate the parameter during printing.

By controlling the print heads 80–87 based on these parameters of the printer 10, ink dots may be printed in precise controlled locations on the image without regard to complex timing schemes, in favor of a relative timing mechanism as described herein. This precise control helps to avoid problems such as banding, stitching, and granularity, and other defects in printed output.

Pixel Location Synthesis Logic

The drum used in a preferred embodiment of the present printing system has a circumference of fifty inches and one thousand (1000) encoder slots per revolution, thus providing a resolution of twenty encoder phase cycles per linear inch of exterior surface of the drum member. In this embodiment, the present invention utilizes a 300 dpi resolution print head when printing, this does not provide sufficient resolution to place ink dots at the same resolution of the 300 dpi locations. The pixel location synthesis logic generates synthetic pixel locations based on the 20 dpi encoder phase intervals.

Inaccuracies in inkjet print cartridge location with respect to a carriage upon which the cartridges reside during printing, and encoder disk placement on the axis of the rotating drum affects registration, or actual printing locations, between and among the nozzles of the ink jet cartridges of different color inks. The inventors have found that this imprecise positional effect of this type can cause droplets of ink to fall on non-pixel boundaries. Due to this, it is desirable to actively allow, or more precisely control, the ink droplet locations to be at non-300 dpi locations. The pixel location synthesis logic allows for this by generating sub-pixel locations at every eighth of a pixel.

As can be appreciated with reference to FIG. 3, the encoder phase A signal is used as the base encoder signal, and since phase A and phase B differ only by phase, this choice is arbitrary. The rising edge of phase A is herein defined as the point at which an encoder cycle begins and ends, but this choice is also arbitrary. The Phase Edge Detector 280 detects the rising edge of the Encoder Phase A, and produces the Encoder Phase Edge signal. The Encoder Phase Edge Signal is fed to the Phase Interval Counter 282 which counts the number of high frequency clock intervals that occur between phase A rising edges and this value is output as the Phase Interval Clock Count. As previously described, the encoder phase edges occur every $\frac{1}{20}$ of an inch. In a 300 dpi system, this is, every 15 pixels. The Phase Interval Clock Count is the number of clocks that occurred between encoder phases, or every 15 pixels. Thus, the number of clock counts that occurred during a pixel interval is the Phase Interval Clock Count divided by 15. The Phase Interval Clock Count is divided by 15 to generate the Pixel Clock Count, which is the number of high frequency clocks that occurred during a pixel interval. Due to the complexity of dividing by 15 in digital logic, this block is implemented in software or could be done in logic.

The Pixel Clock Count is fed to the Pixel Generator 284, which produces the signal Pixel Clock, which is a pulse that occurs at the start of every pixel interval. The signal Encoder Phase Edge is also fed to the Pixel Generator 284 to resync the pixel generation at the start of each encoder phase interval. The Pixel Counter also includes logic that assures that no more than 15 pixel pulses occur between each Encoder Phase Edge pulse.

Then the Pixel Clock count is divided by 8 to produce the SubPixel Clock Count, which is the number of high frequency clocks that occurred during a pixel interval. The Pixel Clock Count is fed to the two SubPixel Generators, which generate pulses that occur at the start of each subpixel interval. The active SubPixel Generator alternates between pixel occurrences.

For example, at the start of a pixel interval, Subpixel Generator 0 is synced by the Pixel Clock, and SubPixel Generator 1 is not. SubPixel Generator 0 will then use the SubPixel Clock Count to generate 8 subpixels at the subpixel interval. The SubPixel Generators contain logic that assures that no more than 8 sibpixel pulses occur once they are resynced. Thus, Subixel Generator 0 will produce 8 subpixels and then stop. When the next pixel interval begins, SubPixel Generator 1 is synced by the Pixel Clock, and SubPixel Generator 0 is not. SubPixel Generator 1 will then use the SubPixel Clock Count to generate 8 subpixels. The alternating between SubPixel Generators continues to occur at the start of every pixel.

The outputs of the SubPixel Generators are logically OR'd together so that a subpixel generated by either of them at any time is a valid subpixel. This is to allow for variations in drum speed, as can be appreciated with reference to the following paragraphs.

Due to the fact that the pixel clock count must be generated by division in software, these is a delay of one encoder phase interval between the sampling an encoder phase interval and the actual use of its measured period. The relationship is shown in the FIG. 5. The pixel generation system is a predictive system. Values of previous encoder phase intervals are used to generate pixel and subpixel clocks in the encoder phase intervals that follow. If the drum speed is constant, than all pixels will occur within the encoder phase interval in which they were initiated, and all subpixels will occur within the pixel interval that initiated them. Since there are 15 pixels per encoder phase interval, for a pixel not to occur in the encoder phase interval in which it was initiated would require that the encoder phase interval shrink by $\frac{1}{15}$ (6.67%) over the course of 3 encoder phase intervals. This case is assumed to not occur.

Logically, the encoder phase interval can grow between encoder phase intervals by any amount. The system will always generate 15 pixels per encoder phase.

The SubPixel Clock Count is derived from the Pixel Clock Count. The division for this is done by shifting digital logic bits, which can result in truncation. While this may contribute to subpixel interval errors, it assures that 8 subpixels will occur within the pixel interval, provided the pixel interval is allowed to be the value that the subpixel clock count was derived from. This holds true for the first 14 pixels of the encoder phase interval, but the 15th pixel is subject to resyncronization on the next encoder phase edge.

If the encoder phase interval grows, this presents no problem, since all subpixels will be allowed to complete within the pixel interval that initiated them.

If the encoder phase interval shrinks, the interval of the 15th pixel may shrink enough so that the 8 subpixels do not all occur before the encoder phase edge re-synchronizes the pixel clock, thus providing an opportunity to lose subpixels. Since there are 120 subpixels per encoder phase interval, the encoder phase interval may only shrink $\frac{1}{120}$ (0.833%) before this problem occurs. This case is assumed to happen.

Figure 6:
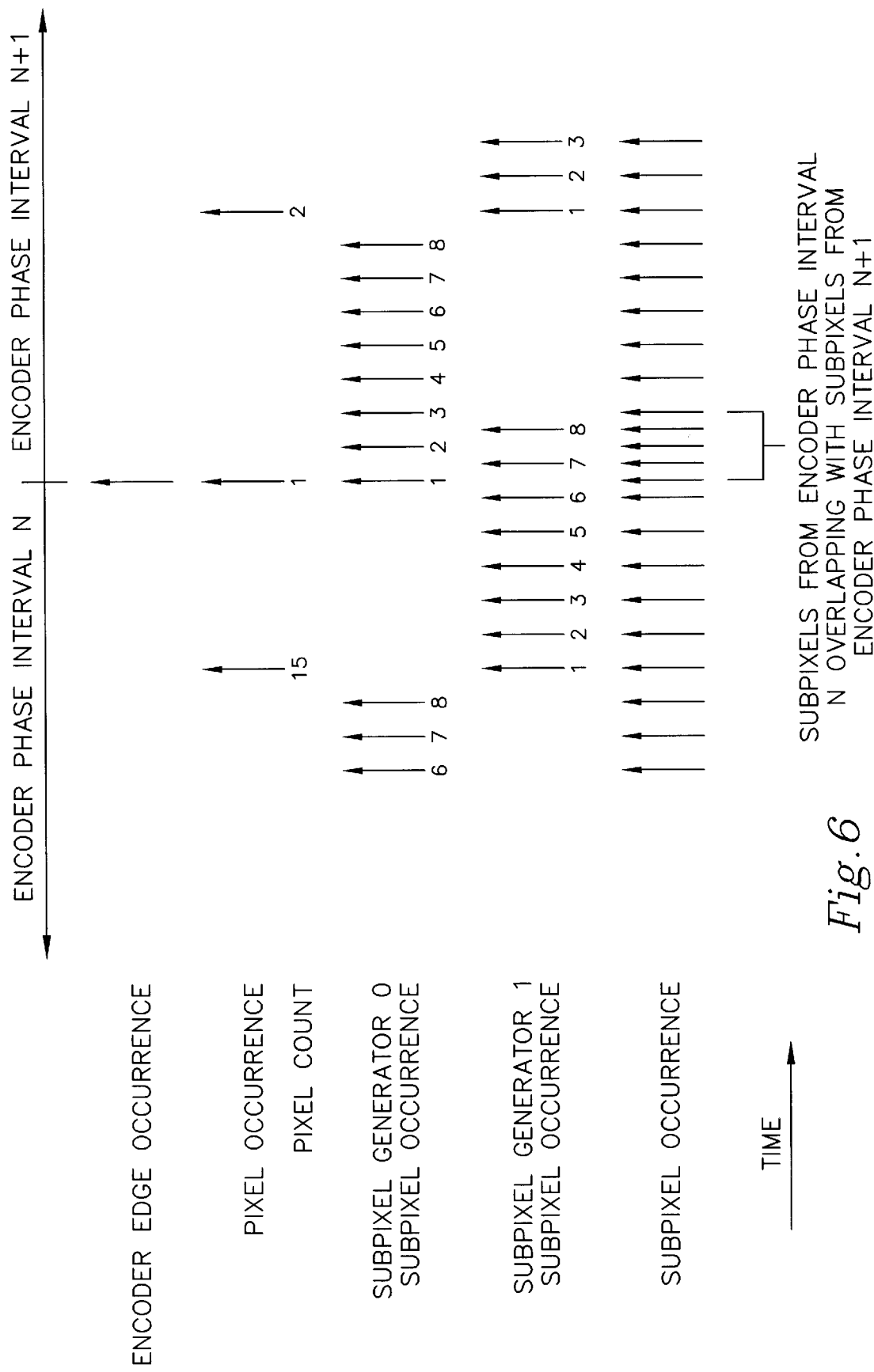
FIG. 6 depicts a subpixel overlap timing diagram for the present invention illustrating how subpixels from an encoder phase interval N overlap with subpixels from encoder phase interval N+1.
Figure 7:
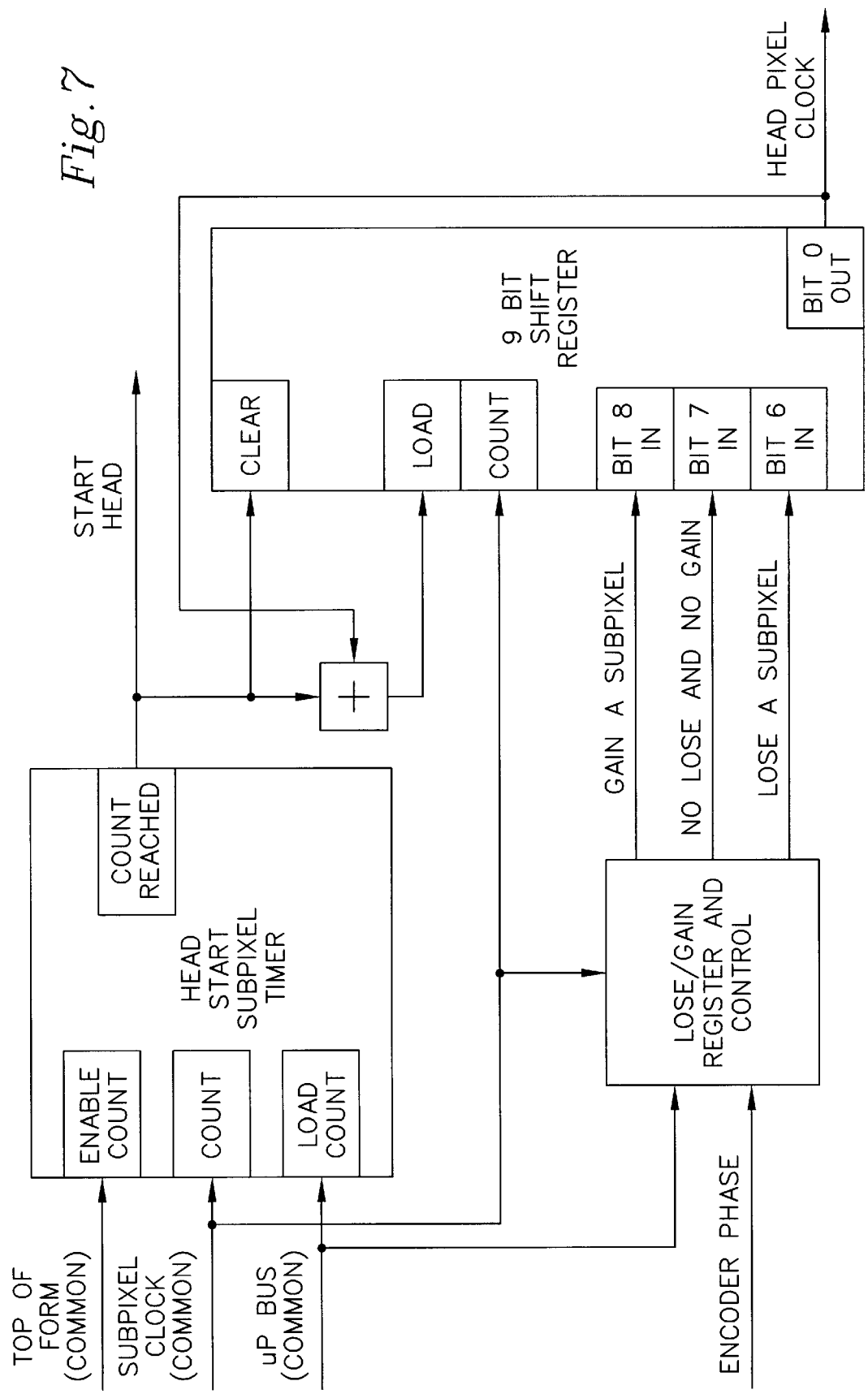
FIG. 7 is a block flow diagram depicting the rotational registration logic for one print head as used in the present invention.
Figure 8:
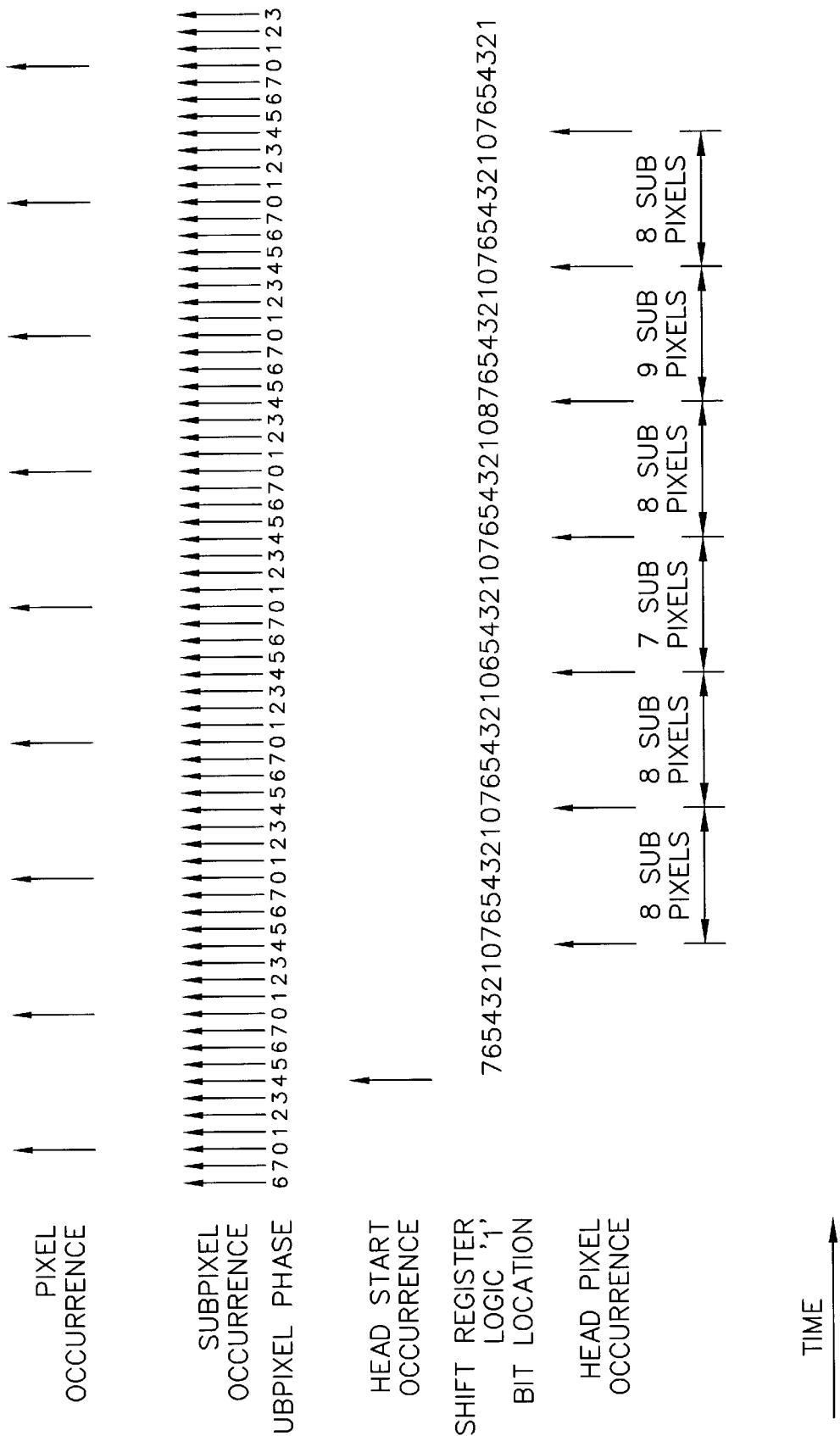
FIG. 8 depicts the subpixel gain/loss activity at non-encoded phase points.

The solution to this problem is to use two separate subpixel generators 288,290 which operate on alternating pixels. Each time a subpixel generator is resynced to a pixel clock, it always generates 8 subpixels. The outputs of the SubPixel Generators 288,290 are logically ORed together (at 292) so that a subpixel generated by either of them at any time is a valid subpixel. This allows subpixels from a pixel to intermix with subpixels of the following pixel, without a loss of subpixels, as shown in FIG. 6.

The term "Registration" as used herein defines the physical synchronization of each print head to the other print heads, so that the highest quality printed output results when ink droplets dispensed from a nozzle 98 of one print head 80–87 must be printed either on top of, or next to previously printed droplets so that a viewer detects the appropriate desired color at each such location. Since the surface of the drum member 100 varies, the surface of the drum must be characterized and each such surface variation accounted for during each printing operation. In one embodiment, a plurality of rows and columns of special calibration patterns are printed on media residing on the drum. As seen in FIG. 13, 14, and 15 one portion of each such pattern relates to axial registration 165 and another portion relates to rotational registration 164. In one embodiment, ten rows and twelve columns are printed in a periodically repeating sequence over the surface of the print media. Thus, at initial manufacturing, or periodically thereafter, an operator prints the above-described calibration patterns and visually compares and then determines which set of pixels in the patterns ate optimally co-located, thereby solving head-to-head displacement among the several heads typically used in practicing the present invention. The compensation values for each print head, shown to cover a range from four to negative four, are then manually entered so that appropriate compensation of the firing sequence of discrete nozzles associated with the print heads are instituted, as more fully explained hereinbelow. Basically, these compensation values are entered into a look up table (LUT) accessible to the printing logic and control circuitry to minutely control the placement of droplets on the print media, thereby compensating for axial vagaries in the surface of the drum member 100. Of course, this technique may employ more or less rows or columns of calibration patterns than the embodiment above described. In fact, the inventors have discovered another embodiment that offers virtually the same advantages as just described, but via a much more compact use of system resources. In this embodiment, which works extremely well in characterizing and ultimately compensating a drum surface having periodic, or sinusoidal, irregularities that result from the manner in which the drum is manufactured, for example, on a lathe or other dynamic manufacturing process. In this embodiment, a single axial pattern necessarily intersects a single rotational pattern and only these two patterns are used in viewing and entering compensation data to the print head control circuitry. In both the embodiments as well as others contemplated by the present invention, the same review and entry of compensation values into a LUT occurs.

As for the periodic nature of the surface irregularities, the inventors have further found that both a rail sagging phenomena, alone or in combination with a slight "crowning" of the drum surface affects axial registration in the same periodic manner for every printing operation. Likewise, even a slight offset from the absolute center of rotation of an axial shaft disposed at the axis of rotation of the drum can consistently impact rotational registration, which is suitably compensated by the inventive method taught and claimed herein.

Since the physical surface characteristics of the drum are more or less static, and the attachment points for the print heads to the carriage assembly are also virtually static, the drum need not be periodically scrutinized for error however later calibration among print heads may be necessary as new print heads replace used heads and are oftentimes coupled to the carriage in a slightly different orientation than the print head they replaced.

For optimum image quality, each of the heads in the present inventive print system need to place dots on the 300×300 dpi grid over the entire drum surface.

Many variables contribute to head-to-head registration errors. These errors are static—meaning that once the mechanical components are manufactured and set into position and print cartridges added, no further error results—but contribute differently on different area of the drum surface. Some examples are:

Variations in supporting features and facets of the print cartridges

Variations in cartridge mounting hardware interface on the carriage assembly

Variations in drum surface

Non-concentric encoder disk mounting

Variations in rail system

The printing system of the present invention provides a means of correcting for these errors over the entire surface of the drum.

To reiterate, axial registration is handled purely as a plurality of software functions. The planes for the colors are simply shifted in memory relative to each other, until an acceptable registration is obtained. The attainable resolution at which dots can be moved to correct the registration is one pixel. The magnitude is limited only by the available memory.

To reiterate further, rotational registration is performed in the digital logic of the printing system, under control of the software. The logic provides a means of dynamically changing the head-to-head registration during printing. The system is comprised of two parts, the Head Start Position and the SubPixel Lose/Gain Function. The head start position function determines when a head starts imaging relative to a page top-of-form. The microprocessor programs the Head Start Subpixel Timer with the desired subpixel delay from page top-of-form to when the head begins imaging. The top-of-form starts the timer counting subpixels. When the programmed number of subpixels have occurred, the Start Head signal asserts, which causes the imaging logic for the head to start.

Since each head can be registered at subpixel resolution, each head has a individual Head Pixel Clock, that indicates that the head is at a pixel location. The Head Pixel Clock is generated by a 9 bit shift register.

The shift register is first loaded with a new data pattern when Head Start occurs. This also clears all the bits in the shift register, preventing old values from generating unwanted states. Assuming no SubPixel Lose/Gain activity, a logic '1' is loaded into bit 7 of the shift register. This bit advances through the shift register at each subpixel occurrence, until it reaches the 0th bit.

A logic '1' at the 0th bit then causes another shift register load to occur. Assuming no SubPixel Lose/Gain activity, this pattern will repeat, generating a Head Pixel Clock every 8 SubPixel Clocks.

The Head Pixel Clock has no affect on the common Pixel Clock and SubPixel Clock. They provide the reference signals for the individual Head Pixel Clocks. Note that the Head Start Position can occur during any of the 8 common SubPixel Clocks that occur during a common Pixel Clock. The common SubPixel Clock that a Head Start occurs on is referred to as the SubPixel Phase.

The SubPixel Lose/Gain function allows head-to-head registration to be dynamically changed. In this case, the microprocessor writes to the SubPixel Lose/Gain Register, to specify that a head is to shift it's SubPixel Phase. This can be done to the head on an individual basis.

The Head Lose/Gain Register is examined at the start of every Encoder Phase Interval. Commands to lose or gain a subpixel control the shift register bit that gets loaded with the logic '1'. This occurs on only one Subpixel Interval per Encoder Phase Interval.

In the case of losing a subpixel, bit 6 of the shift register is loaded with the logic '1'. This causes one Head Pixel Clock to be only 7 subpixels in duration, thus decrementing the Head Pixel's SubPixel Phase.

In the case of gaining a subpixel, bit 8 of the shift register is loaded with the logic '1'. This causes one Head Pixel Clock to be 9 subpixels in duration, thus incrementing the Head Pixel's SubPixel Phase.

Since the logic contains individual Head Start Position and SubPixel Lose/Gain control for each head, the head-to-head registration can be varied dynamically while printing. Thus, the present inventive print engine can account for any factors that affect head-to-head registration over the entire surface of the drum.

In the preferred embodiment, the print heads on the printing system are arranged in two banks, each bank consisting of four print heads oriented around the circumference of the periphery of the drum. The heads are logically grouped in sets of 2, due to the rotational similarity of heads within a set. FIG. 9 shows an elevational side view the drum and the head locations thereon.

The rotationally offset print heads has the potential of making the generation and delivery of image data the heads very complex. The two factors that add to this complexity are alignment of data from the offset heads and print swath overlap.

Figure 5:
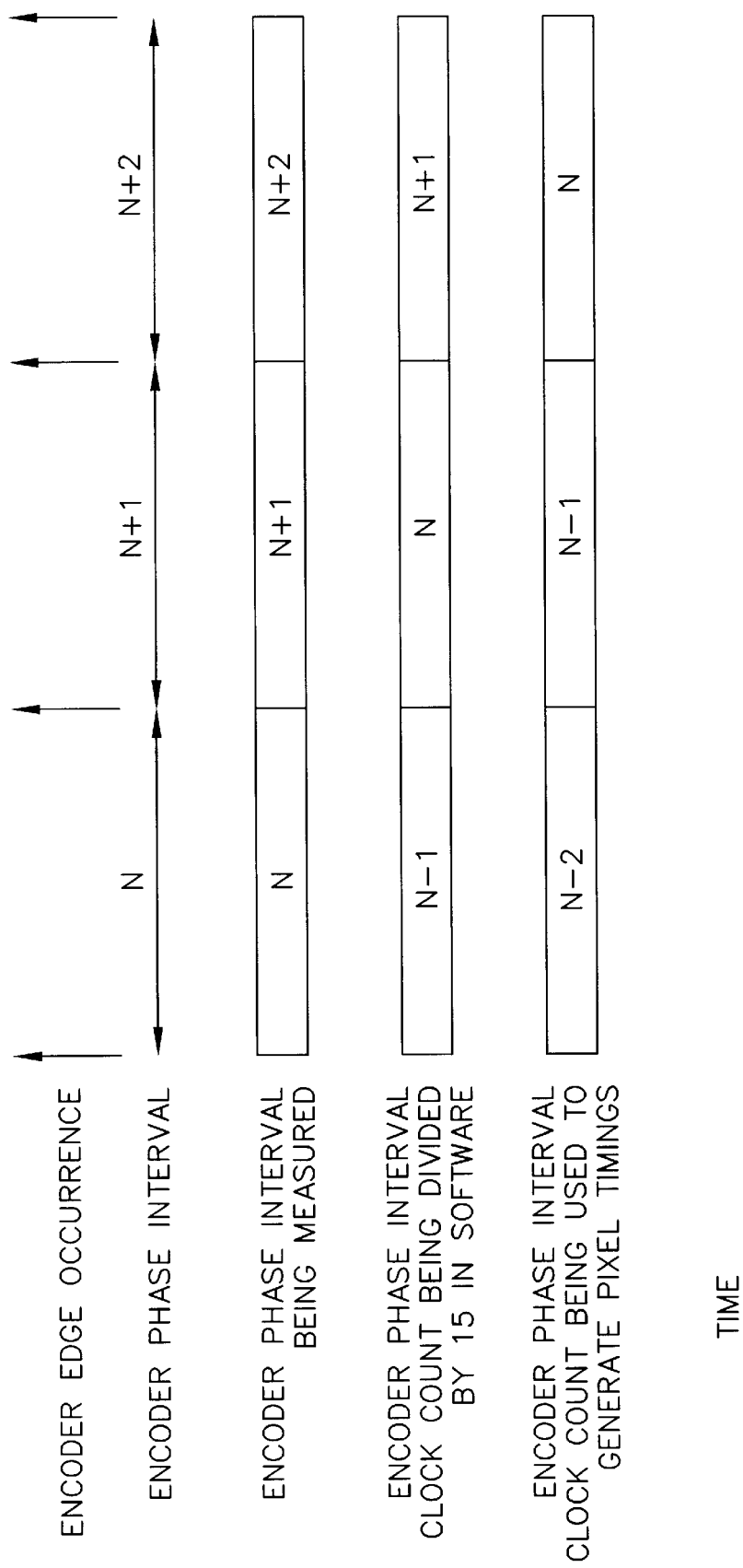
FIG. 5 shows the sequencing of the encoder phase internal counts of the present invention.

To align data from rotationally offset head sets, the imaging data for the heads must be delayed in time to account for the offset. FIG. 5 depicts this relationship of several points in time during the printing of a non-overlapping swath. The operation shown is known as non-overlapping swath because the image size is small enough so there is a time interval where no sets are imaging.

Figure 10:
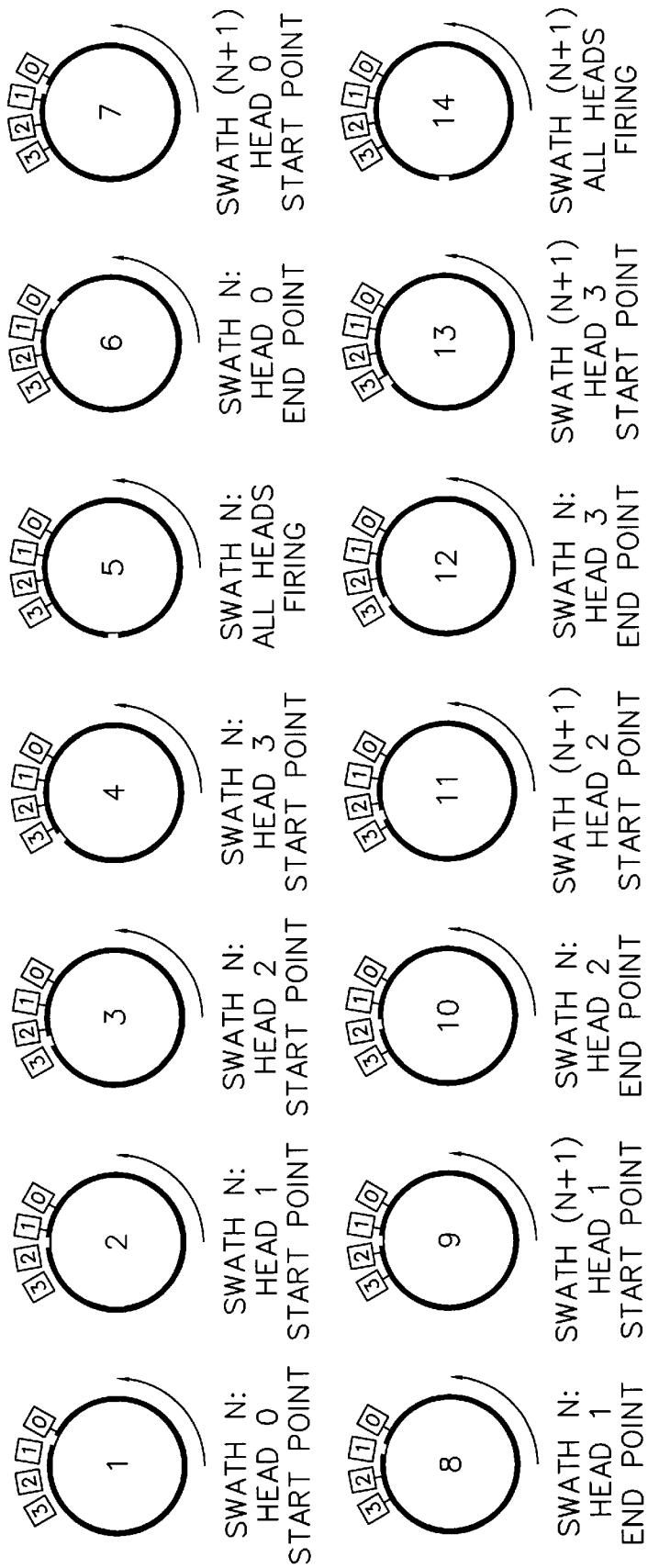
FIG. 10 depicts the relationship between drum position and print head firing for each of two swaths during printing of an image requiring printing overlapping swaths.
Figure 11:
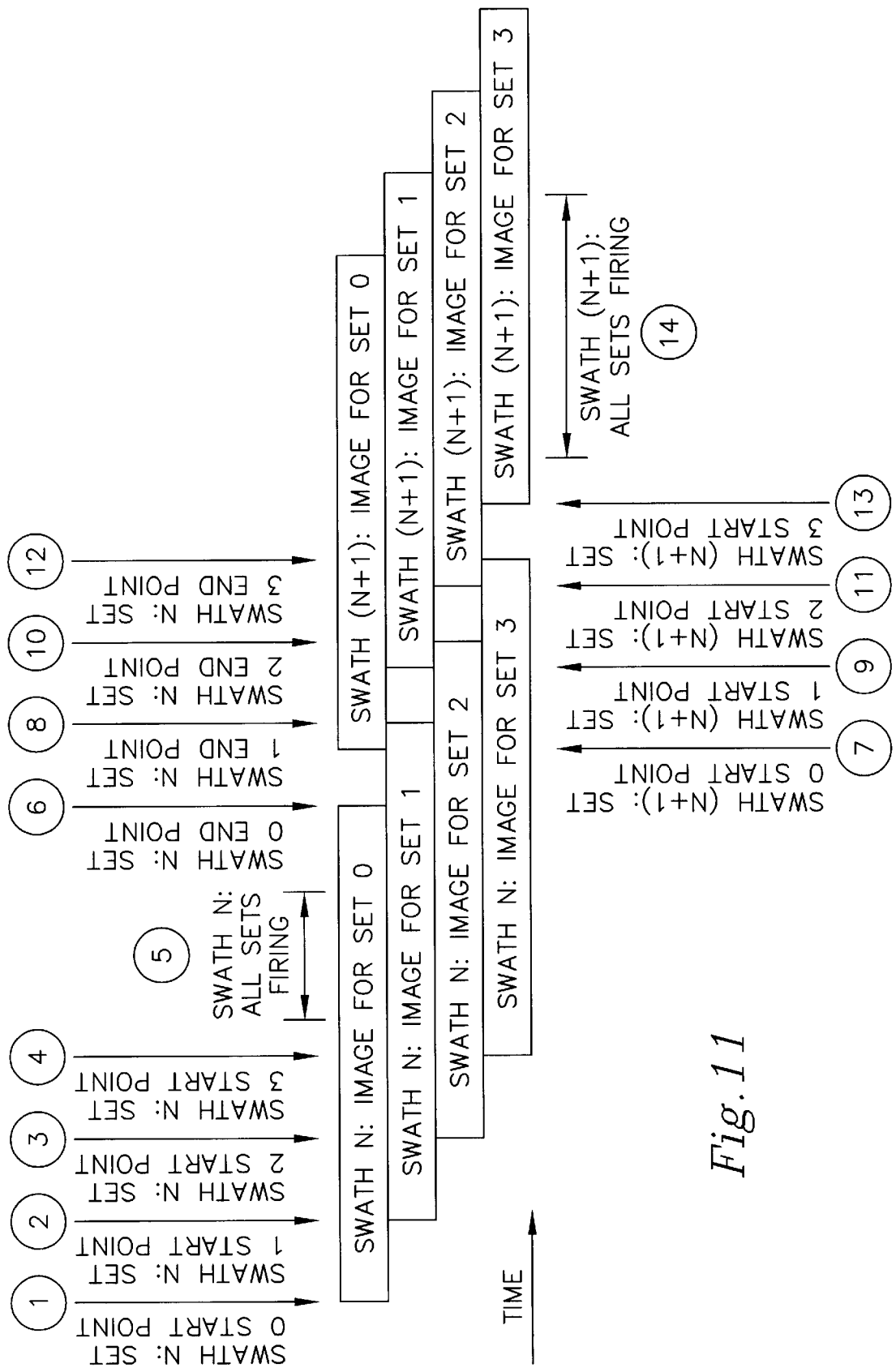
FIG. 11 illustrates how each of fourteen print swaths relate to the other thirteen when printing an image requiring printing overlapping swaths.

As the size of the image becomes larger, the potential exists for the rotational gap in the image to become smaller that the distance between head sets 0 and 3. This condition is known as overlapping swaths and has the effect that some heads sets will be imaging different swaths than other head sets. FIG. 11 illustrates this and in the preceding figure (FIG. 10) the worst case overlap is illustrated. In this scenario, the non-image gap is less than the distance between head sets. This results in a set of print heads being turned off for the gap, then back on without any other head set turning off or on during the period of the gap. In reality, varying sizes of the gap (on a per image basis) can result in many different relationships between the turning on and turning off of head sets during the overlap period. For example, the smallest gap interaction is when head set 0 only overlaps the last head set, head set 3.

The print head offset logic implemented in the present invention system allows the software to create a square image in memory, without regards to head offsets or any other relationship between heads and head sets.

Figure 12A:
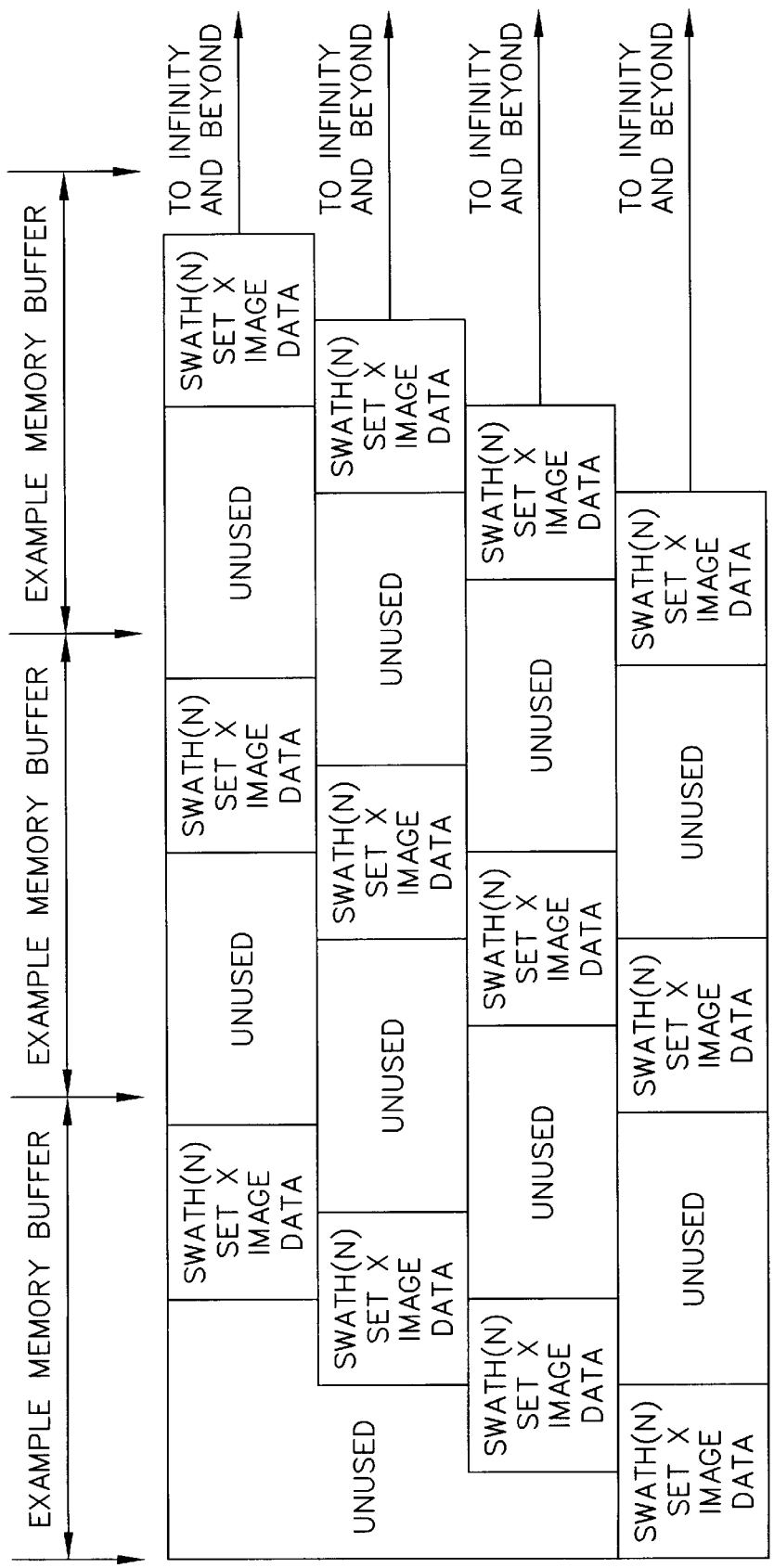
FIG. 12a depicts a prior art memory buffer for a drum-based print engine.
Figure 12B:
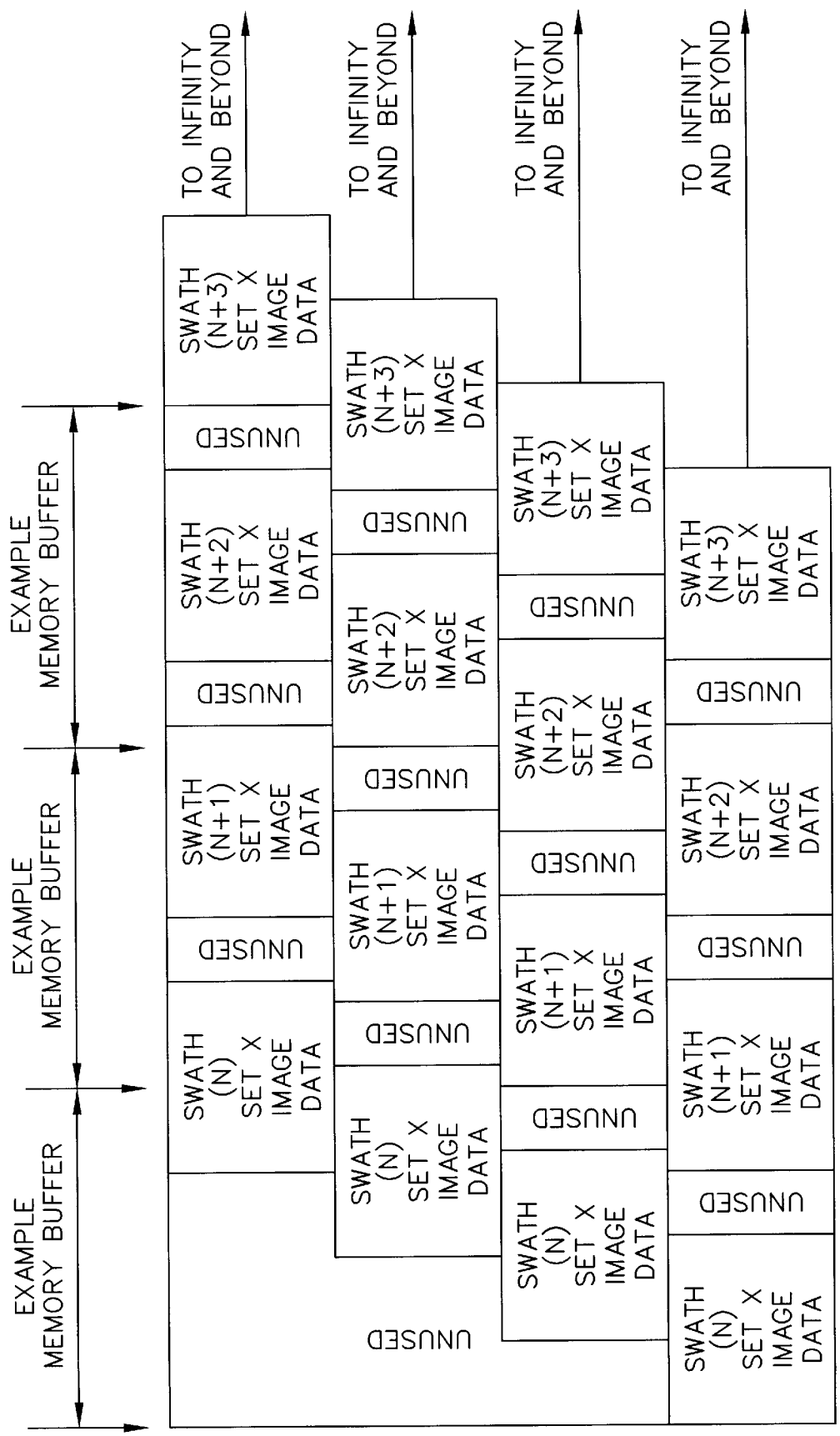
FIG. 12b depicts a prior art memory buffer of a drum-based print engine.

If the temporal image data requirements were mapped into a microprocessor memory of infinite length, the resulting memory map would be as follows (reference FIGS. 12A and 12B).

Having memory of finite length, the most forthcoming solution is a repeating interval mapped into microprocessor memory. The preceding FIG. 12A and 12B identifies a potential memory buffer mapping to the image. Using a repeating memory buffer presents several problems.

1) Memory Overhead—As shown in the preceding figure, there are unused memory locations that map temporally to locations where another head set has valid data. This requires undesirable system memory overhead. In the case of the non-overlapping image, the full unused space would not have to be used, only the portion that maps temporally to locations where another head set has valid data.
2) Data Availability—Because the software would need to image portions of separate swaths in the memory buffer, and because of the on-demand swath printing of the current invention, a swath cannot begin until the imaging software has received the data for two swaths (or at least portions of the next swath). This would increase the memory requirements for the system.
3) Software Complexity—Having to image portions of two swaths into the memory buffer, along with the unused spaces increases the complexity of the software. One other option is to fit the entire image into memory, but would require a large and expensive memory system.

The most efficient solution for memory usage and software complexity is to map the set image data into memory with no head offset shift, and then remove it at the proper times to account for the head offsets. This allows the software to image into memory without concern to the head set offsets, but requires additional resources (microprocessor time or digital logic) to move the data from the memory buffer to the imaging machinery. Additionally, for concurrent imaging and printing, requires a double buffering scheme, which needs enough memory for two swaths worth of data.

Figure 17:
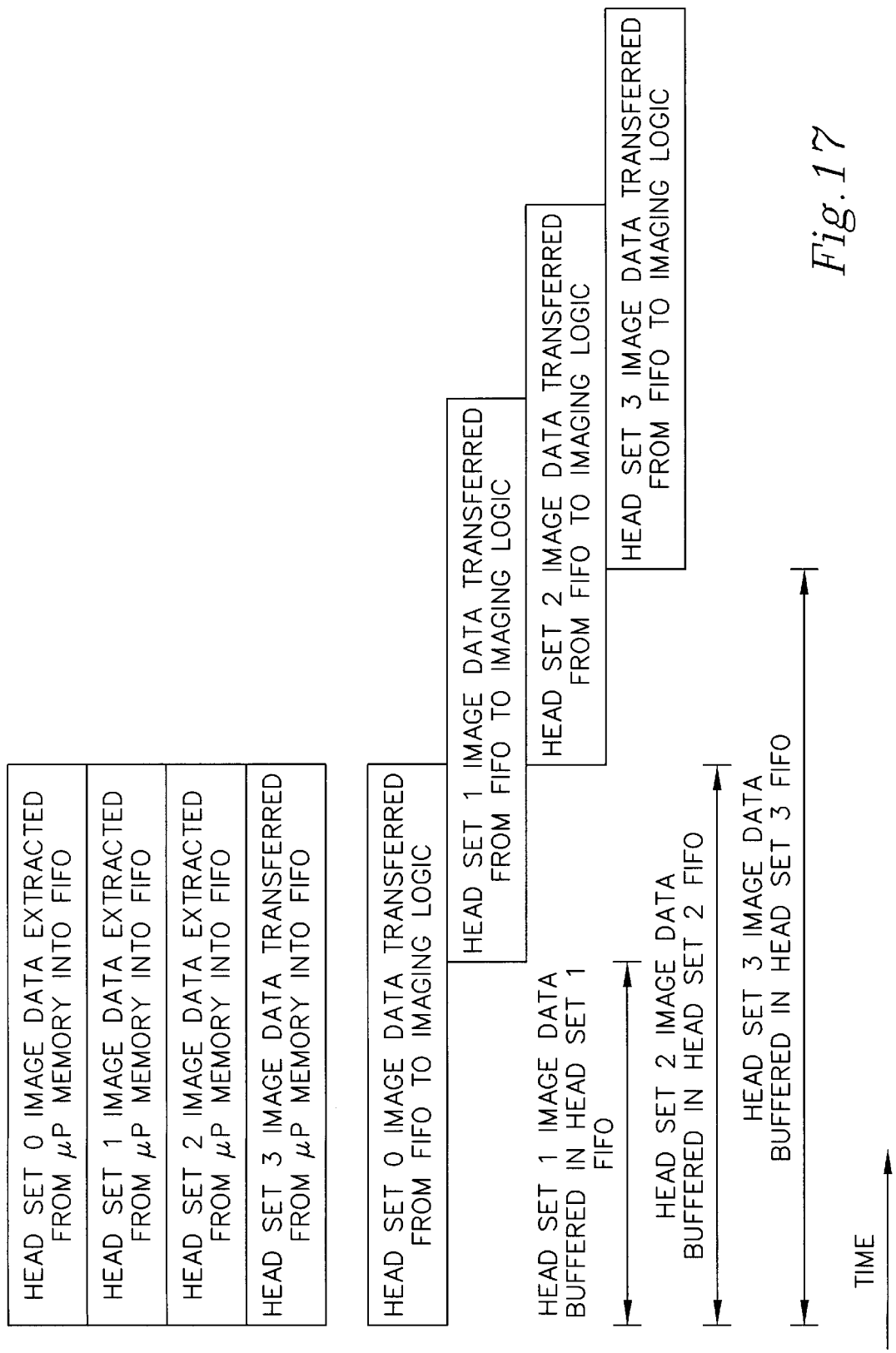
FIG. 17 depicts the transfer of image data from microprocessor to imaging logic.

The present invention implements this type of function in four fifos (first in, first out memory), one for each set of two heads rotationally around the drum. The use of this memory allows the image data values to be transferred from uP memory to the fifos in a linear fashion. The instances where data is extracted from memory but not used immediately is handled by the fifos storing the data until it is needed. This operation is shown in FIG. 17. In this figure it is shown that the image data for head set 0 is needed by the imaging logic immediately after it is transferred to the fifo, thus the depth of the fifo can be small since little or no image data storage capability is required. The head set 0 fifo must store an amount of data equal to the delay between the imaging start for head sets 0 and 1, thus it needs a larger fifo. Each successive fifo must store a larger amount of data. The advantages of this system are that the software can image and transfer the data to the fifo without having to account for the delay between head sets.

Figure 18:
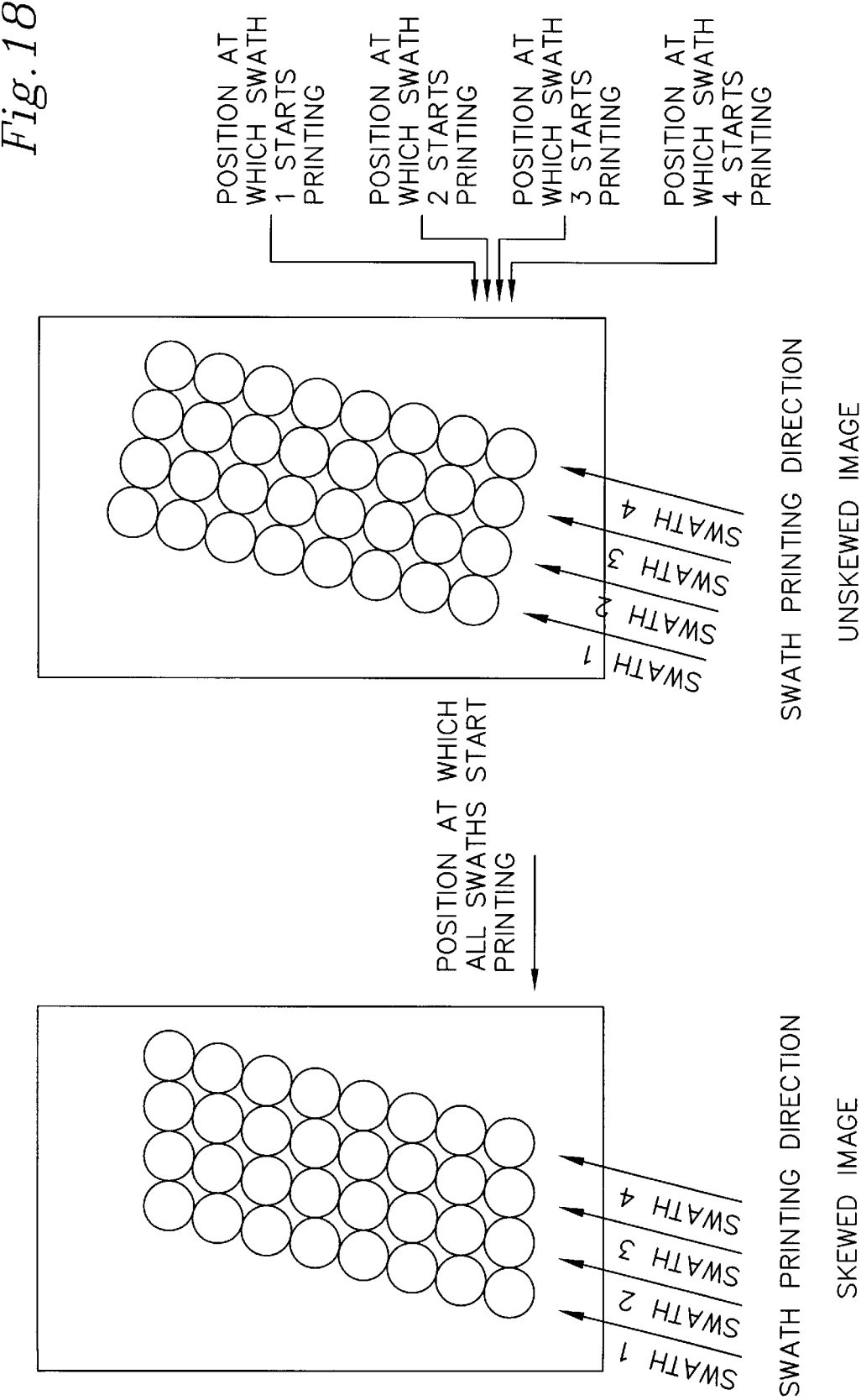
FIG. 18 depicts the prior art skewed and method for de-skewing an image as taught by the present method.

A very important advantage of the pixel control circuitry described herein relates to the fact that in effect, the entire surface of the drum member is synthesized in software into a continuous space of sub-pixel resolution this is separated not by timing delays between nozzle firing events, but rather through an absolute space. Thus many and varied printing techniques are enabled. One outstanding feature of the conversion of the drum surface to a synthesized space of sub-pixel resolution relates to the ability to de-skew an image being printed on a rotary drum based print engine. Please reference FIG. 18 to see an illustration of this effect and the skewed prior art effect. As noted in the discussion of the prior art, as a result of the fact that drum based print engines complete an image by printing a series of adjacent spiraling print swaths. The net effect is that upon close inspection, each edge in a print having perpendicular edges will in fact be printed with square corners. Although the image will still alternatively trend toward, or away from, the edge of the printing medium. The present invention addresses this problem with the prior art by shifting the location where each successive print swath begins printing so that in effect, the entire image is rotated on the printing medium so that it's edges are perpendicular to the edges of the printed output.

Figure 19:
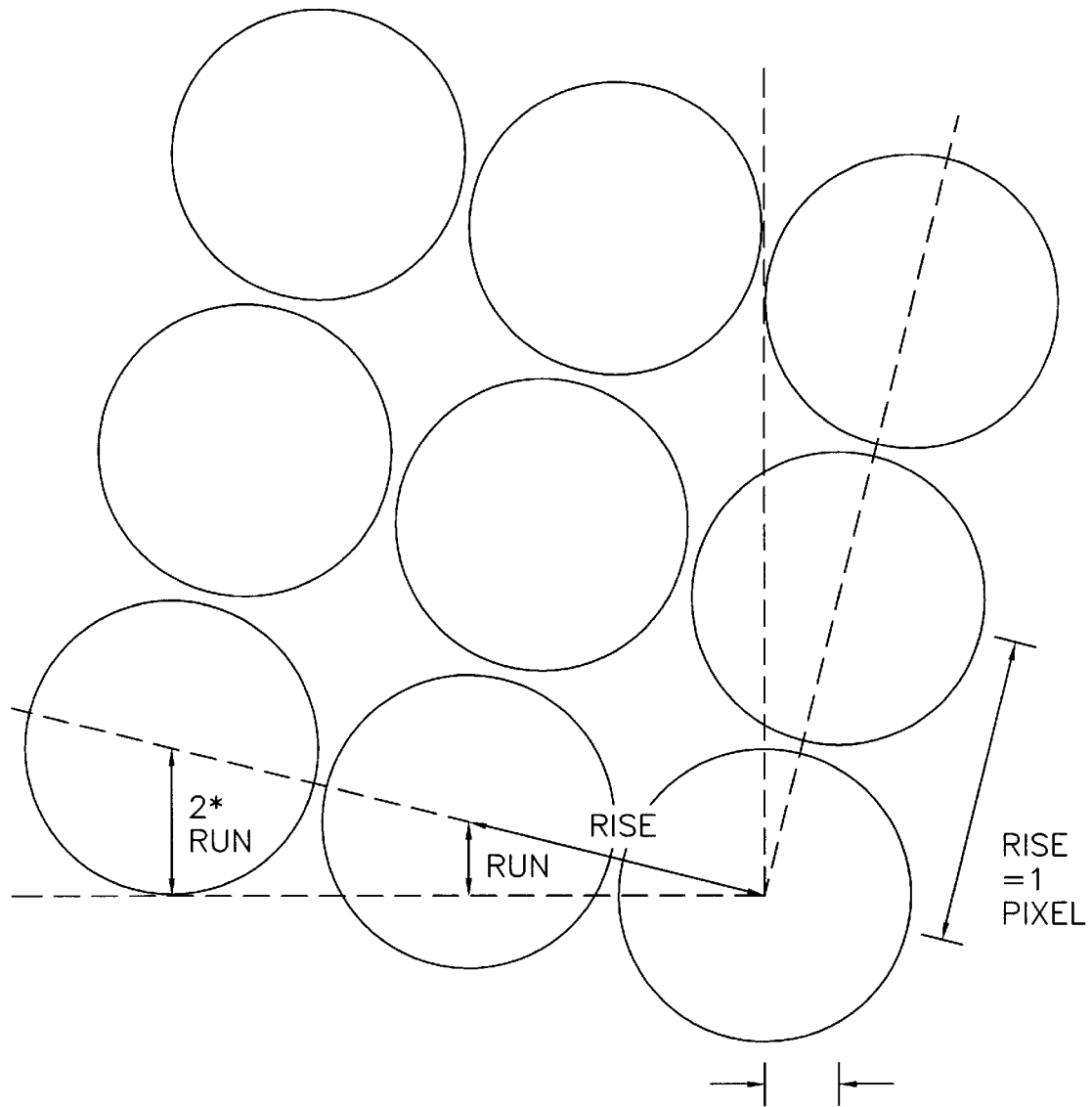
FIG. 19 is an example of an image de-skewing technique.

As can be seen in FIG. 19, a preferred embodiment discovered by the inventors shows that distance is equal to 1.2288 sub-pixels per print swath. One embodiment of this aspect of the present invention encompasses a printing mode wherein after a first printing swath is printed a 1 sub-pixel delay is added to the next, and likewise to each succeeding print swath thereafter so that the delay accumulates across each printed swath. Since this value is not an integer value, and only a unit sub-pixel delay may be implemented for any given print swath, the remaining approximately $\frac{2}{10}^{th}$ of a sub-pixel delay may be carried over until a full unit sub-pixel delay accumulates and then for the next successive print swath delaying the initiation of the printing swath by two sub-pixels. Other error distribution techniques can be used as are known in the printing and resolution improvement art for distributing a remainder of a unit sum along a number of recurring printing operations each contributing a portion of a repeating error. The value of the sub-pixels delay was derived from the appreciation that in a preferred embodiment, 7.68 sub-pixels/inch occur during printing so that each subsequent printing pass must be delayed by about 0.16" which corresponds to about 1.2 sub-pixels noted above. The inventors thus believe that the sub-pixel rendering of the present invention solves at least one long unsolved problem with the prior art, image skewing. While this embodiment applies to the embodiment taught herein it is of course not to be so limited in interpretation.

Although that present invention has been described with reference to a few discrete embodiments, no such limitation is to be read into the claims as they alone define the meters and bounds of the invention disclosed and enabled herein. One of skill in the art will recognize certain insubstantial modifications, minor substitutions, and slight alterations of the method claimed herein, that nonetheless embody the spirit and essence of the claimed invention without departing from the scope of the following claims.

What is claimed is:

1. A method of calibrating a drum-based print engine, including the steps of characterizing the positional interplay among an exterior print media-bearing surface with respect to a plurality of print heads and compensating for non-concentric alignment of a rotation sensor coupled to the axis of rotation of the drum member, comprising the steps of:

attaching a sheet of printing medium to the exterior surface of a cylindrical drum member;

rotating a cylindrical drum member about its axis at a preselected printing velocity;

printing at least two calibration patterns for each discrete ink-dispensing nozzle, one for axial registration a second pattern for rotational registration;

manually comparing the calibration patterns;

manually entering a value corresponding to a best fit into a computer memory;

adjusting a controlled firing sequence command so that each ink-dispensing nozzle prints at a preselected location upon a media coupled to the drum;

accelerating the rotation of the drum member to a constant velocity in excess of the first preselected printing velocity;

recording a timing signal from a rotary encoder coupled to the axis of rotation of the drum member, wherein the timing signal consists of a timed repeating sequence of on and off signals of varying period;

comparing a difference in a first timing signal to an immediately subsequent timing signal over a plurality of revolutions of the drum member;

calculating a best curve fit of the difference in timing signals per rotation of the drum member;

applying the best curve fit to a print head control circuitry so that for each rotation of the drum member a print head at least one nozzle of an ink jet print head emits ink at a precise location.

2. A method of accurately characterizing the surface of a drum based print engine so that an ink material propelled toward a print media attached to the drum member impacts the print media at a precise, preselected location, comprising the steps of:

attaching a printing medium to the exterior surface of a cylindrical drum member;

rotating the drum member at a preselected printing speed;

slewing a carriage assembly axially across the drum member while printing a plurality of calibration patterns from each of a plurality ink emitting nozzles of a plurality of ink jet cartridges;

increasing the speed of rotation of the drum member;

reading an electrical signal output from a rotary encoder device coupled to the axis of rotation of the drum member for a brief period of time;

comparing the electrical signal output from the rotary encoder for each of a succession of rotations of the drum member;

fitting a sinusoidal curve function to the electrical signal output from the rotary encoder device;

applying a mathematical representation of the sinusoidal curve function to a print head firing control circuit; and storing the mathematical representation for later reference and application during subsequent printing operations of the print engine.

3. A method of de-skewing an image to be printed on a rotary drum-based digital print engine, comprising the steps of:

a. printing a first print swath of an image to be printed on a media coupled to a rotary drum-based print engine b. inserting a location delay to an print initiation command for a next printing print swath of a length equal to a unit sub-pixel closest to a predetermined amount of linear delay required to produce a square image corner boundary;

c. printing the next printing print swath after applying the location delay; and d. return to step b, until the image has been printed upon the printing medium.

4. The method of claim 3, including the further step of determining whether proper de-skewed printing of an image requires a non integer location delay, expressed as an integer number of sub-pixel lengths, and if so wherein the non-integer portion of the location delay is accumulated and distributed over one of a next occurring print swaths.

5. The method of claim 3 wherein an end-user may select the amount of the sub-pixel delay, as expressed in sub-pixels, so that an image to be printed may again be skewed with respect to the bordering edges of a printing medium.

* * * * *